US012058226B2

(12) United States Patent
De Smet

(10) Patent No.: US 12,058,226 B2
(45) Date of Patent: Aug. 6, 2024

(54) GENERALIZED RESOURCE ACCOUNTANT

(71) Applicant: MICROSOFT TECHNOLOGY LICENSING, LLC, Redmond, WA (US)

(72) Inventor: Bart J. F. De Smet, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 17/465,531

(22) Filed: Sep. 2, 2021

(65) Prior Publication Data

US 2021/0400121 A1 Dec. 23, 2021

Related U.S. Application Data

(63) Continuation of application No. 16/256,354, filed on Jan. 24, 2019, now Pat. No. 11,128,731.

(51) Int. Cl.
*H04L 67/60* (2022.01)
*G06F 9/50* (2006.01)
*G06F 11/30* (2006.01)
*H04L 67/10* (2022.01)

(52) U.S. Cl.
CPC ............ *H04L 67/60* (2022.05); *G06F 9/5072* (2013.01); *G06F 11/3006* (2013.01); *H04L 67/10* (2013.01)

(58) Field of Classification Search
CPC ....... H04L 67/60; H04L 67/10; G06F 9/5072; G06F 11/3006; G06F 9/542; G06F 2209/508
See application file for complete search history.

(56) References Cited

U.S. PATENT DOCUMENTS 9,912,767 B1 * 3/2018 Weald ................ G06Q 30/0241
11,914,608 B2 * 2/2024 Sasamoto .......... G06Q 10/0631
2005/0163107 A1 * 7/2005 Gunturi ................... H04L 45/56
370/352

(Continued)

FOREIGN PATENT DOCUMENTS

EP 3588292 A1 1/2020
WO 2017101997 A1 6/2017

OTHER PUBLICATIONS

U.S. Appl. No. 16/256,354, filed Jan. 24, 2019.

(Continued)

*Primary Examiner* — Meng Vang
*Assistant Examiner* — Tania M Pena-Santana
(74) *Attorney, Agent, or Firm* — Workman Nydegger

(57) ABSTRACT

Techniques for utilizing a metric tracking agent to track how resources are used to process a payload across different network boundaries are disclosed herein. A process that is to be performed on a payload within a boundary is identified. A metric tracking agent is also identified, where this metric tracking agent defines a scope of the process and is associated with a metric counter used to determine a metric value for the process. While the process is being performed in accordance with the defined scope, the metric value is calculated so as to reflect the resource usage expended by the network boundary and is logged by a log associated with the metric tracking agent. The metric tracking agent, which includes the metric value, is then provided to either a subsequent system boundary or to a metric store.

21 Claims, 19 Drawing Sheets

(56) References Cited

U.S. PATENT DOCUMENTS

| | | | |
|---|---|---|---|
| 2007/0143218 A1* | 6/2007 | Vasa | G06F 21/10 |
| | | | 705/51 |
| 2014/0068629 A1* | 3/2014 | Boller | G06F 11/0709 |
| | | | 719/313 |
| 2015/0212920 A1* | 7/2015 | Kraus | G06F 11/3006 |
| | | | 717/127 |
| 2016/0255147 A1* | 9/2016 | Kitabayashi | H04L 41/12 |
| | | | 709/217 |
| 2018/0203738 A1 | 7/2018 | Banerjee et al. | |
| 2020/0104375 A1* | 4/2020 | Earnesty, Jr. | G06F 16/214 |
| 2022/0086075 A1* | 3/2022 | Nee | H04L 41/142 |

OTHER PUBLICATIONS

"Office Action Issued in European Patent Application No. 19842991. 2", Mailed Date: Dec. 19, 2022, 9 Pages. (MS# 405686-EP-EPT).

* cited by examiner

GENERALIZED RESOURCE ACCOUNTANT

CROSS-REFERENCE TO RELATED APPLICATIONS

This application is a continuation of U.S. patent application Ser. No. 16/256,354 filed on Jan. 24, 2019, entitled "GENERALIZED RESOURCE ACCOUNTANT," which issued as U.S. Pat. No. 11,128,731 on Sep. 21, 2021, and which application is expressly incorporated herein by reference in its entirety.

BACKGROUND

Computers and computing systems have impacted nearly every aspect of modern living. Computers are generally involved in work, recreation, healthcare, transportation, entertainment, household management, etc.

Computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS")), and deployment models (e.g., private cloud, community cloud, public cloud, hybrid cloud, etc.).

Cloud and remote based service applications are prevalent. Such applications are hosted on public and private remote systems such as clouds and usually offer a set of web-based services and other resources to client systems (e.g., tenants). These resources may include hardware (e.g., storage devices) for storing data, as well as virtual machines for processing the data, and various communication pipes (e.g., portals, interfaces, and communication channels) for accessing and distributing data.

Service providers are often concerned with providing tenants with a proper amount of cloud resources (including devices, network pipelines, and virtual machines). Furthermore, service providers desire to provide these resources at a desired quality of service (QoS). To this end, it is beneficial to understand how different system components are being used to store, process, and communicate the data. It is also beneficial to understand which compute nodes are providing the services. This information can be used to make optimizations to the network and to ensure that the network is able to provide the desired services and the desired QoS, notwithstanding any kind or amount of variability in the network conditions.

Unfortunately, it is sometimes difficult to determine exactly where a process is occurring within a distributed system, particularly one that utilizes processing components to service a plurality of different tenants. Consequently, it is correspondingly difficult to appropriately and accurately attribute, associate, or assign resource usage to the compute nodes that are actually performing the services/processes. More specifically, it is often unclear which compute nodes should be attributed (or identified) as being the responsible entities processing the data, particularly when the processing occurs in a cloud environment and when the resources of the cloud are shared among multiple tenants. What is needed, therefore, is an improved methodology for monitoring compute resource usage/utilization and for accurately attributing this usage/utilization to the proper compute nodes.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices that accurately monitor compute node usage and that accurately attribute (i.e., assign or associate) this usage to the corresponding/responsible compute node. A compute node can perform any type of CPU-bound operation, networking operation, or storage operation. A compute node includes, but is not limited to, any type of physical computing device (e.g., a CPU, computer, server, etc.) or virtual computing device (e.g., virtual machines, containers, etc.).

In some embodiments, a process, which is to be performed on a payload and which is performed within a network/system boundary, is first identified. After the process is performed, a processed payload is generated and transmitted to a subsequent network/system boundary. Before the process is performed, however, a scope of that process is defined within a metric tracking agent. The metric tracking agent is actually for the subsequent network/system boundary such that the subsequent boundary at least partially defines the scope for the process. This metric tracking agent is specifically linked to the scope of the process and is associated with a metric counter (also referred to herein as a "metric tracker"). The metric counter can be incremented (or a delta value can be computed between some before metric and some after metric) and used to calculate a metric value of physical and/or logical processing units associated with the process. The process is performed, and the metric tracking agent is used to log the metric value for that process. Subsequently, this metric value is linked to the process and then provided to at least one of (i) the subsequent boundary and/or (ii) a metric store.

In some embodiments, computational usage within a network that includes an upstream component that processes data for one or more downstream components is tracked. In doing so, the upstream component receives a data packet that is to be processed (e.g., by a particular process) for a downstream component. Additionally, a metric tracking agent, which is associated with a metric counter that can be used to calculate a metric value of a physical and/or logical processing unit associated with the particular process, is received. Then, at the upstream component, the particular process is applied to the data packet so as to generate a processed data packet. The metric tracking agent is used at the upstream component to log the metric value of the process. Furthermore, the metric value is provided to at least one of (i) the downstream component or (ii) a metric store.

In some embodiments, computational usage is tracked within a network that includes one or more upstream components that process data for one or more downstream components. For example, a downstream component is configured to receive a processed data packet from an upstream component. The downstream component also receives a request from the upstream component for a metric tracking agent that is associated with a metric counter that can be used to calculate a metric value. This metric value is calculated for physical and/or logical processing units that are tasked with performing a particular process on data in order to generate the processed data. The downstream component provides the metric tracking agent to the upstream component and also receives the processed data packet. Additionally, the downstream component receives the metric value associated with the process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 8 illustrates how usage data can be discharged up a chain of metric counters or agents.

DETAILED DESCRIPTION

Figure 1:
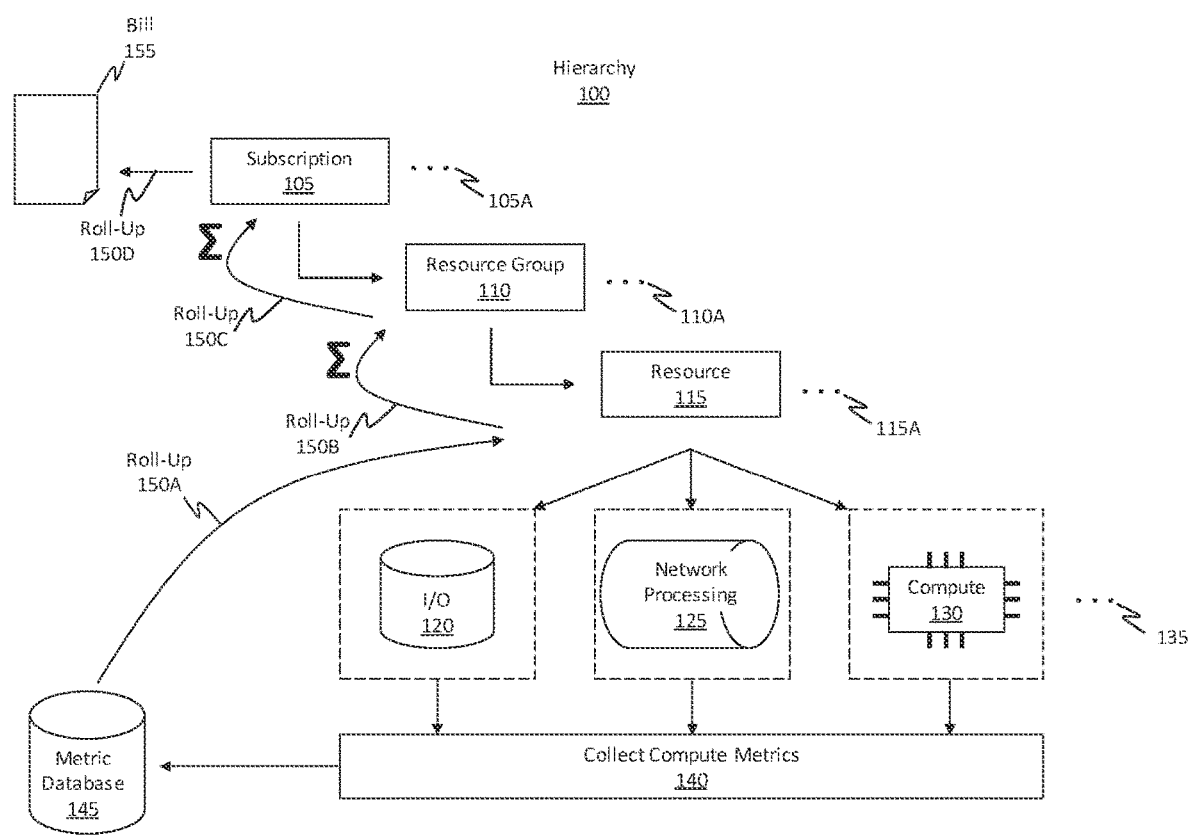
FIG. 1 illustrates a generalized resource usage attribution architecture in which resource usage/utilization is lazily attributed to one or more compute nodes without regard to any kind of stimulus that actually triggered the usage of those compute nodes.

The disclosed embodiments relate to systems, methods, and devices that can be used for facilitating the monitoring and attribution of resource utilization in a distributed network that includes a plurality of compute nodes that process data.

As used herein, a "compute node" can also be referred to as a "component," "resource," or "network component." A compute node can perform any type of CPU-bound operation, networking operation, or storage operation. The term "boundary", "network boundary," and "system boundary," may include a combination of one or more compute nodes that are used to process data. The term "boundary" is also used interchangeably, sometimes, with the term "domain,"

and represents a logical isolation partition between different compute nodes that are logically separated. Each boundary and compute node may actually include one or more different nodes/components/resources that are logically grouped together.

In some embodiments, after a certain computing process is performed at a compute boundary/component, a processed payload is generated and transmitted to a subsequent compute boundary/component. In these embodiments, the metric tracking agent of the subsequent compute boundary/component is identified and linked to the processing of the payload for the subsequent compute boundary. This metric tracking agent includes a metric counter that can be incremented (or a delta value and be calculated by comparing some before metric to some after metric) in order to calculate a metric value of any processing on the payload before it is provided to the subsequent compute boundary/component. After the metric tracking agent logs the metric value, the metric value is provided to the subsequent boundary/component and/or to another network entity (e.g., a third-party metric store or usage attribution engine).

Technical Benefits

The disclosed embodiments may be used to improve the current technology in a vast number of different ways. For example, by practicing the disclosed principles, a cloud services provider will be able to make more intelligent and informed decisions with regard to which entities were involved in processing data (e.g., event data). This heightened level of information will allow the provider to attribute, allocate, or otherwise assign costs among compute nodes and other entities in a more accurate and precise manner. Consequently, entities and compute nodes will not be improperly charged for expenses that should not have been attributed to them. In this regard, the disclosed embodiments substantially improve how entities interact with the cloud service provider, thereby providing an improved end user or tenant experience.

The disclosed embodiments also operate to improve the design and/or optimization of a network architecture. For instance, by more accurately pinpointing which specific compute nodes are performing computations, some of which may be inefficient or redundant, the disclosed embodiments can generate or provide highly valuable feedback that may be used in overhauling, tuning, or optimizing one or more portions of the network infrastructure.

By way of example, suppose certain processing is identified as being inefficient as a result of that processing being too far removed from a central pipeline network component. The disclosed embodiments are able to identify these inefficiencies and submit feedback to human developers to rearrange the processing so as to place that processing closer to the central pipeline. In some instances, this rearrangement can even be performed automatically and without human developer involvement. Regardless of how the rearrangement occurs, once the processing is placed closer to the central pipeline, then the processing can be performed in a more efficient manner. Accordingly, the disclosed operations significantly improve how a network operates and can be used to redesign, restructure, or otherwise optimize the architecture of the network itself. In this regard, the disclosed embodiments provide a practical, real-world, and highly beneficial improvement/application to the technology of network services.

Different optimizations can also be implemented, manually or automatically, by triggering the allocation of increased or, alternatively, decreased resource usage in a network in response to determining relative component utilization.

Accordingly, the disclosed embodiments can be used to guide optimizations within a network infrastructure. The disclosed embodiments, therefore, can be used to not only provide improved cost and usage distribution, but they can also be used to improve resource placement and allocation. Stated differently, the disclosed techniques result in improved resource usage tracking at a more refined granularity level for specific hardware or logic instances and resources. The disclosed embodiments are also operable within any type of multi-tenant infrastructure, as will be described later. As such, many benefits may be achieved by practicing the disclosed principles.

Lazy Technique For Attributing Resource Usage

As indicated earlier, the disclosed embodiments improve how resources (e.g., compute processing units, network services, input/output ("I/O") operations, etc.) are used and monitored. As used herein, the term "resource usage" is used to describe any processing that is consumed, expended, or "used" by a particular resource. The term "resource usage" is also used interchangeably with the term "resource utilization."

The term "compute node," described above, may include any type of computer resource such as, for example, virtual machines ("VM"), servers, computer systems, routers, switches, data storage devices, network fabric (e.g., control plane and user plane), or any other type of computing device included within a network infrastructure. In this regard, it will be appreciated that any type of computer operation or computer resource may be monitored. As such, resource usage is not limited simply to monitoring only processing units, network services, or I/O operations.

Figure 2A:
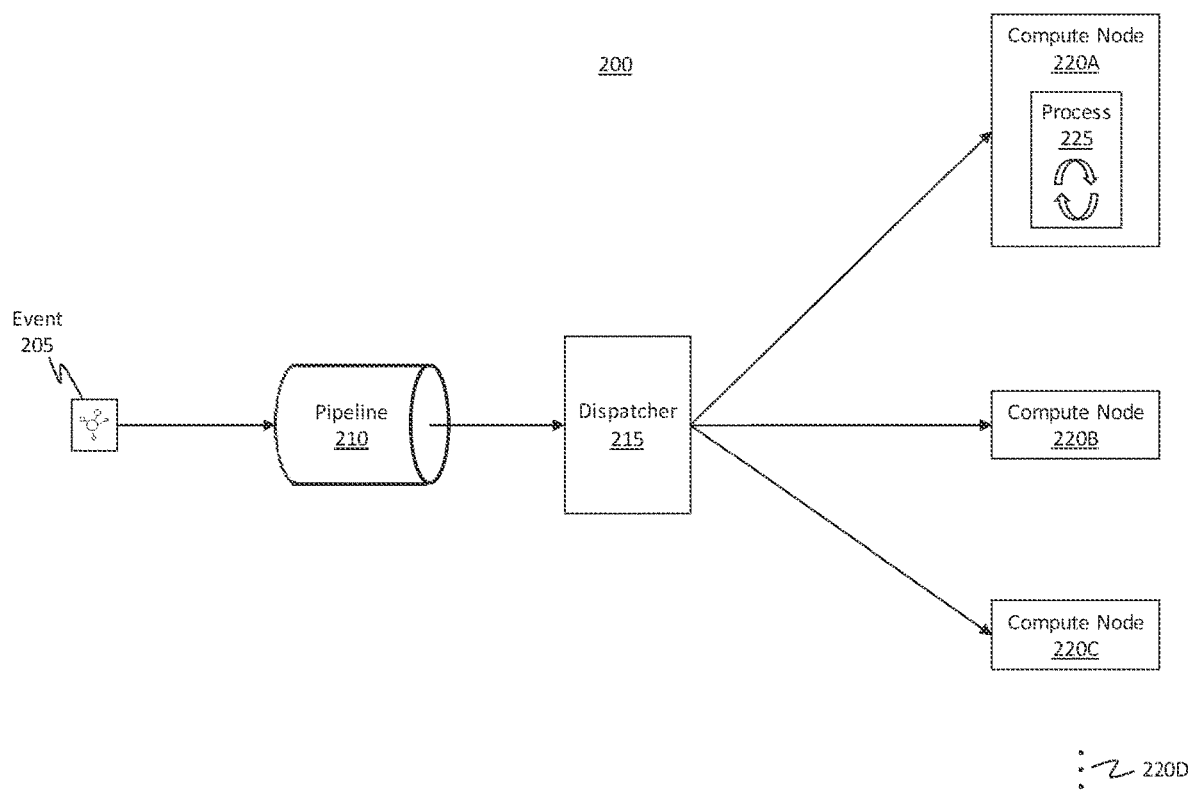
FIG. 2A illustrates an event stream processing architecture.
Figure 2B:
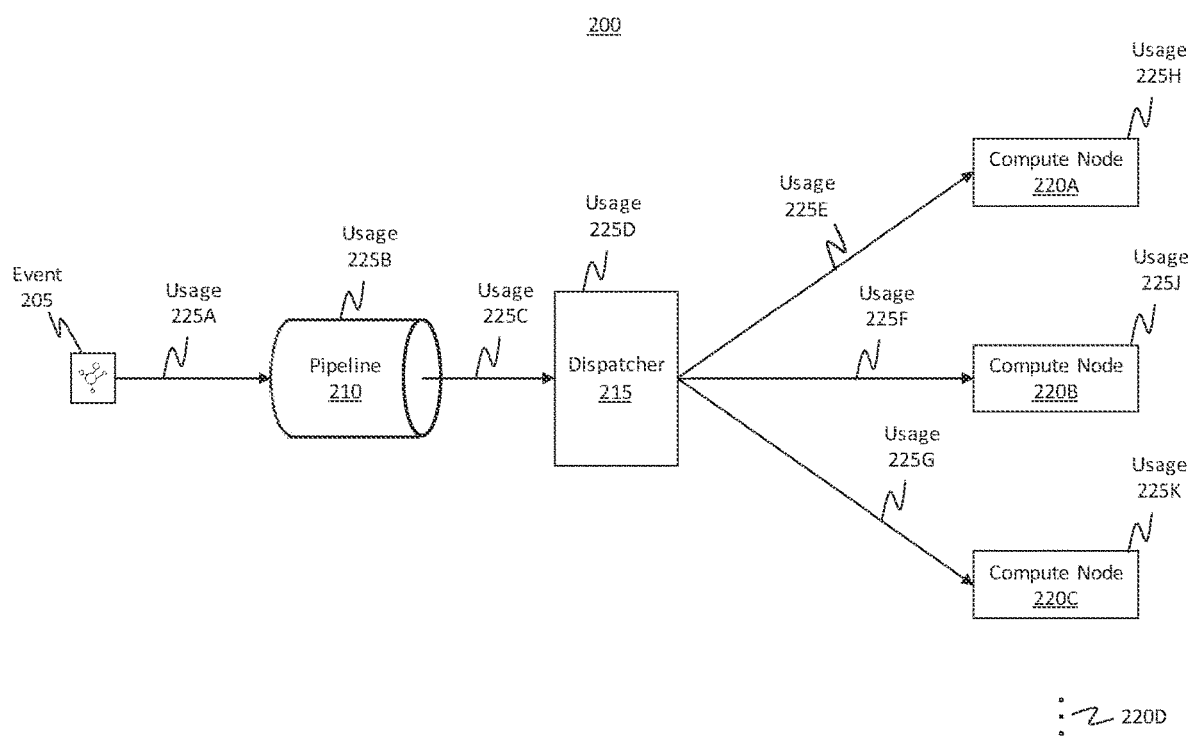
FIG. 2B illustrates how resources are used at different locations and different amounts across the multiple different compute nodes of the architecture.
Figure 2C:
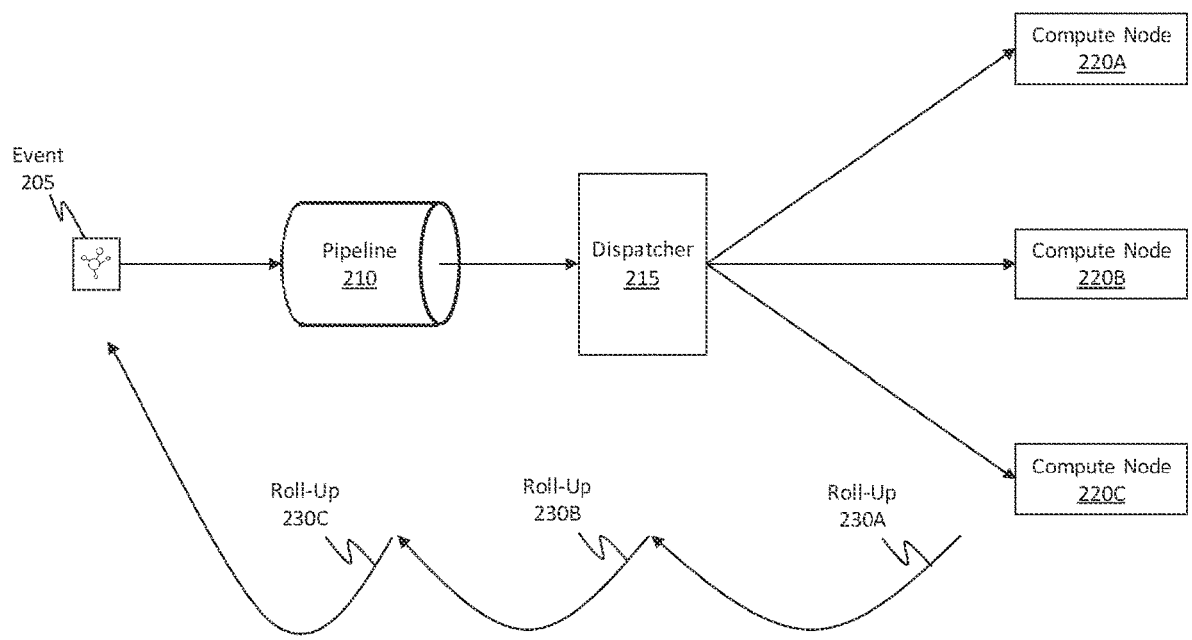
FIG. 2C illustrates how a lazy attribution scheme is inadequate for an event stream processing architecture.

With that understanding, attention will first be directed to FIG. 1, which illustrates a lazy technique for monitoring resource usage and attributing this resource utilization to a particular subscriber/tenant. FIGS. 2A through 2C demonstrate how this lazy technique, while useful for some types of network architectures, is less than optimal for other types of network architectures (e.g., an event stream processing architecture). The remaining figures, therefore, describe various different improved methodologies for monitoring the resource usage within any type of architecture.

FIG. 1 shows an example hierarchy 100 that may be used to attribute resource usage to particular compute nodes. Hierarchy 100 is divided into multiple different layers. One layer is for a subscription 105, with the ellipsis 105A demonstrating how any number of subscriptions may be included in the hierarchy 100. Subscription 105 may be any type of subscription, such as, but not limited to, a tenant operating in a cloud service, a database subscription, or any other type of subscription service.

One or more resource group(s) 110 can be associated with the subscription 105, where the ellipsis 110A shows that any number of resource groups may be provided within subscription 105. As used herein, resource group 110 refers to a collection of compute nodes (i.e., "resources") that are assigned, provided, or otherwise associated with subscription 105. As an example, a particular tenant or subscriber may be provided with a compilation of compute nodes (e.g., VMs, servers, network fabric, network I/O devices, etc.) that may be reserved for the exclusive or non-exclusive use of that tenant. Further, the arrangement or configuration of resource group 110 may adhere to any level or degree of isolation requirements.

Within resource group 110, one or more specific resource(s) 115 are provided. As used herein, resource 115 can also be termed as a "compute node" and, as described earlier, refers to any type of resource within the network. The ellipsis 115A demonstrates how any number of resources may be included within resource group 110.

Resource 115 is shown as including I/O 120 (e.g., storage devices and associated storage operations), network processing 125 (e.g., network fabric or any other type of network device), and computational devices 130 (e.g., a VM, server, CPU, etc.). The ellipsis 135 demonstrates how any other type of computing device may be included in resource 115. For brevity purposes, the terms "resource" and/or "compute node" collectively refers to the I/O 120 (also referred to herein as any type of storage or storage operation), network processing 125, computational devices 130, and any other type of computing devices. Furthermore, these compute nodes may be physically and/or logically isolated from one another.

Within hierarchy 100, any amount of metrics may be collected (e.g., as shown by the box labelled "collect compute metrics 140") from the compute nodes included in resource 115. These metrics include, but are not limited to, the amount of processor ticks or cycles used to perform an operation, the amount of time spent to perform an operation, the number of I/O calls or operations performed, the amount of bandwidth consumed for an operation, the number of threads or other resources reserved or used to perform an operation, and so on. In this regard, metrics may be computed, collected, or otherwise obtained to record and monitor any amount of resource usage involved in processing a request or in performing any kind of operation.

These metrics may be compiled, stored, or otherwise maintained in a metric database 145. Once the metrics are obtained and included within the metric database 145, then the lazy technique performs a number of nested roll-up operations. These roll-up operations are performed in order to attribute/associate the monitored resource usage/utilization to a particular subscriber identified by subscription 105.

Stated differently, the metrics (in some instances) can be used for financial purposes in order to charge or expense the usage of the resources to a particular client/subscriber. Using network resources is not free and comes at a cost. These costs should be attributed to clients/subscribers who are required to pay fees in order to use the services, hardware, and/or software of a cloud service provider. As such, cloud service providers desire to monitor and record (in the form of metrics) which resources/compute nodes are used by which clients/subscribers. In addition to financial implementations, the disclosed embodiments can also be used to improve the organization of the network itself, as will be described in more detail later.

Accordingly, FIG. 1 shows how different roll-up operations (e.g., roll-up 150A, 150B, 150C, and 150D) may be performed in order to summate (e.g., see the summation indicators between each level in hierarchy 100) the monitored resource usage. Once the total amount of resource usage is determined, then a bill 155 can be created and delivered to a client/subscriber for payment.

The so-called lazy technique described with respect to hierarchy 100 is beneficial in many scenarios. One drawback with this lazy technique, however, is that costs are not attributed to a particular stimulus. That is, the lazy technique simply monitors when a compute node is operating and then assigns a cost of that operation to a client. While useful in many cases, this lazy technique sometimes results in a widespread, blanket-like expense being attributed to a client, and the client is often left unknowing which specific process stimulated, or rather triggered, the occurrence of the compute node processing/usage. That is, the lazy technique is often inadequate for detailing the lineage associated with a cost, where the lineage describes resource usage.

This lack of knowledge regarding which specific resources were used is made even more pronounced in another type of architecture, which is shown in FIG. 2A. Accordingly, attention will now be directed to FIG. 2A, which shows an event stream processing architecture 200.

Event Stream Processing Architecture

Architecture 200 is shown as receiving an event 205. Event 205 is any type of action, occurrence, or state that is recognized by a compute node (e.g., resource 115 from FIG. 1). Event 205 can be generated in a synchronous or asynchronous manner such that event 205 can be provided to architecture 200 at any time and for any reason.

As a practical example, consider a household environment that includes any number of Internet-of-Things ("IoT" devices). Some of these IoT devices may include a smart thermostat, a smart refrigerator, and a climate control system. In one scenario, the smart thermostat may sense that the current temperature of the house is 68° F. One or more conditions may be set in the smart thermostat to cause it to trigger the climate control system to either heat or cool the house. For instance, the smart thermostat may cause the climate control system to heat the house when the temperature is below 70° F. In this scenario, therefore, the identification of the temperature being 68° F. constitutes a type of event, which can then be used to spur or trigger the occurrence of some action (e.g., cause the climate control system to heat the house).

As another example, the smart refrigerator may determine that the house is low on milk because the current milk container is only 25% full. Identifying the current fill status of the milk container constitutes another type of event. Sending a text message or other kind of notification to the homeowner (or even automatically ordering new milk) can constitute an action performed in response to the event.

In a network environment, any type of identifiable occurrence can be considered as event 205 (e.g., receipt of new publication data, a lag in the network, etc.). Accordingly, as used herein, the term "event" should be interpreted broadly to cover any type of identifiable occurrence, action, or state within the network.

Event 205 may be published by any entity, be it a human using a computer system or a computing device itself. As shown, event 205 is entering a pipeline 210. As used herein, the term "pipeline" generally refers to any type or kind of logical entity capable of receiving events and capable of preparing those events for distribution to any number of interested entities/subscribers. With reference back to the household example, pipeline 210 may be a server or computer system associated with the house, where the server is able to receive the temperature and milk events from the different IoT devices and determine whether an action should be performed based on those events. For instance, if the smart thermostat issued an event indicating that the house's current temperature was 71° F., then the server would not need to trigger any kind of heating action because the current temperature is above the minimum threshold requirement.

Pipeline 210 is also able to manage any number of subscriptions to determine which entities are to receive the data included within event 205. In this regard, pipeline 210 may be associated with a database of subscription information and can use this database in preparing and managing how event 205 is to be handled.

Once pipeline 210 receives event 205, it identifies which interested entities (i.e., subscribers) are to receive event 205. In some cases, pipeline 210 inherently includes a dispatcher 215 capable of delivering event 205 to the subscribers. In other cases, dispatcher 215 is a separate entity from pipeline 210, and pipeline 210 is able to provide event 205 to dispatcher 215.

Regardless of how dispatcher 215 is implemented, dispatcher 215 is configured to actually send/transmit event 205 to one or more interested entities (e.g., via parallel or serial transmissions), where the sending process is based on how pipeline 210 prepared event 205. In the scenario presented in FIG. 2A, dispatcher 215 is scheduled to send event 205 to compute nodes 220A, 220B, and 220C, each of which are considered an "interested entity" or "subscriber." Furthermore, each compute node 220A-C may be associated with a different tenant such that architecture 200 may be a multi-tenant architecture. The ellipsis 220D shows how any number of interested entities may be associated with pipeline 210. That is, any number of interested entities/subscribers may be listening, or rather subscribed, to the data stemming from pipeline 210. The number of interested entities may be in the hundreds, thousands, millions, or even billions. Accordingly, an innumerable number of interested entities may be associated with pipeline 210.

Compute nodes 220A, 220B, and 220C may be configured to perform any type of operation, process, or action in response to receiving event 205. For instance, compute node 220A is shown as performing process 225 on event 205. The other compute nodes may also perform specific processes on their events as well. With reference to the household example, the climate control system may be one example of a compute node capable of acting in response to an event. For example, the climate control system, when triggered, can act to produce hot air to warm the house, produce cold air to cool the house, or do nothing because the temperature is within an acceptable range.

As another example, pipeline 210 may be a type of managed database. The entity that published event 205 can be considered as an entity that inserted some data into the database, with the insert operation being event 205. Compute nodes 220A, 220B, and 220C can be any number of stored procedures (or any other type of triggerable operation) that operate on the database in response to event 205. As such, some embodiments may be implemented as a database management system.

In a network environment, a compute node may perform any type of computing operation. For instance, compute node 220A may be a type of client device interested in receiving event data associated with news stories. When a particular type of news story (e.g., sporting, political, business, etc.) enters pipeline 210, compute node 220A may receive information indicating that the particular type of news story was just published. To continue the example, compute node 220A may then alert a human subscriber to inform the human of the emerging news story. Of course, this is just an example only, and the embodiments should not be thusly limited. Indeed, any type of computing event and action may be performed (e.g., an event can indicate a server or switch has failed so that a compute node can alert an IT professional to replace the failed device while also perhaps automatically submitting an inventory request for a new one).

With architecture 200, the lazy roll-up technique described with reference to FIG. 1 may be inadequate for accurately and precisely attributing cost to a particular compute node, client, or subscriber. For example, compute node 220A may be only a simple "receive and re-direct" type of compute node that performs little-to-no processing when it receives event 205. On the other hand, compute node 220B may perform an extensive amount of processing in response to the receipt of event 205. Similarly compute node 220C may be configured to perform even more extensive processing in response to event 205. The lazy roll-up technique is inadequate to address such conditions, as described below.

For example, based on the scenario presented in FIG. 2A, it appears as though the single event 205 is responsible, or rather is the stimulus, for all of the resource usage performed by compute nodes 220A, 220B, and 220C and perhaps even at least some of the resource usage performed by pipeline 210 and dispatcher 215. If the lazy technique described in FIG. 1 were used, then the entity that created/published event 205 would be charged with a substantial portion (or even all) of the resource usage of all of the compute nodes, even though that publishing entity might not have any control over which compute nodes performed operations in response to event 205. For instance, the publishing entity of event 205 may have little-to-no control over compute nodes 220A, 220B, and 220C, yet those compute nodes are performing actions in response to event 205. In this case, if the publishing entity were attributed (and financially charged) with the resource usage performed by compute nodes 220A, 220B, and 220C, then the publishing entity would likely be overcharged and, therefore, disincentivized to continue using architecture 200.

Resource Usage Monitoring And Attribution

FIG. 2B provides more detail on such a situation. Specifically, FIG. 2B also shows architecture 200, which is the same as architecture 200 from FIG. 2A. Here, however, different resource usages are identified across the different network entities.

To illustrate, some network fabric/piping is used to transmit event 205 to pipeline 210. Consequently, some resource usage 225A is expended for that transport. Some resource usage 225B is expended as a result of pipeline 210 performing its operations. Some resource usage 225C is expended to transport event 205 from pipeline 210 to the dispatcher 215, which then consumes some of its own resources, as shown by resource usage 225D. Network fabric costs are consumed (e.g., see resource usage 225E, 225F, and 225G) to push event 205 from dispatcher 215 to the different compute nodes 220A, 220B, and 220C. Then, each of those compute nodes expends resources to process event 205, as shown by resource usage 225H, 225J, and 225K. Accordingly, different network entities are involved in processing event 205, and those entities use resources to perform their operations.

FIG. 2C shows how, if the roll-up technique described in FIG. 1 were used, then the publishing entity of event 205 would be charged in an inaccurate manner. Specifically, FIG. 2C shows different roll-up operations (e.g., roll-up 230A, 230B, and 230C) that are used by the lazy technique to attribute resource usage to specific entities (e.g., subscribers, compute nodes, etc.). Such a technique is particularly inadequate in an event stream processing architecture, such as architecture 200.

For instance, in a system using boundaries/isolation for CPU utilization, the publishing entity of event 205 would be charged for all of the CPU usage of compute nodes 220A, 220B, and 220C because the stimulus of those CPU usages originates from event 205. Conceivably, the publishing entity of event 205 may be responsible for some of the initial resource usage (e.g., some of the resource usage of pipeline 210 and perhaps even of dispatcher 215), but the publishing entity has little-to-no control over the resource usage of compute nodes 220A, 220B, and 220C. As such, the publishing entity should not be penalized (e.g., overly charged) for the resource usage of the different compute nodes. Accordingly, an improved technique for monitoring and attributing resource usage is desired.

Figure 3:
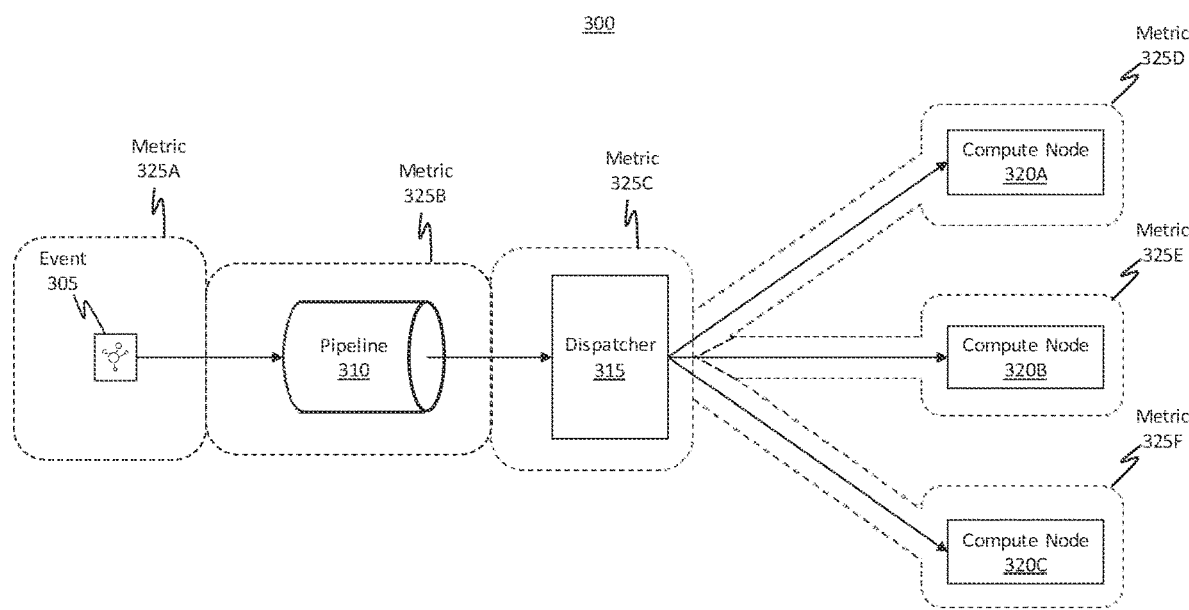
FIG. 3 illustrates an improved methodology for attributing/associating resource usage to specific compute nodes, where the resource usage is linked or otherwise associated with a particular stimulus (e.g., incoming event data).

In particular, it is desirable to accurately and precisely identify which compute nodes are performing operations and to accurately and precisely attribute the resource usage costs and metrics of those operations to those specific compute nodes. For instance, FIG. 3 shows an example architecture that is similar to architecture 200 of FIGS. 2A-2C. Here, architecture 300 is also receiving an event 305 at a pipeline 310, which then delivers event 305 to dispatcher 315. Dispatcher 315 then pushes event 305 out to any number of compute nodes, such as compute nodes 320A, 320B, and 320C. Some of the processes performed by dispatcher 315 may be shared processes. Instead of simply equally dividing the shared processes among the different compute nodes, however, it is desirable to accurately attribute specific portions of the shared processing to each of the different compute nodes.

That is, as described earlier, it is particularly desirable to be able to definitively attribute specific resource usage to specific compute nodes. The disclosed embodiments are able to perform these desirable operations. For instance, metric 325A shows how some resource usage may be attributed to the publishing entity that published event 305, metric 325B shows how some resource usage may be attributed to pipeline 310, and metric 325C shows how some resource usage may be attributed to dispatcher 315.

Additionally, metric 325D, metric 325E, and metric 325F show how corresponding resource usages may be attributed to compute nodes 320A, 320B, and 320C, respectively. By attributing specific resource usage with specific compute nodes, a more accurate determination of cost may be generated. Furthermore, as will be described later, this more accurate determination may also be used to perform one or more optimizations or tuning operations on the architecture and network in general. What is needed therefore, is an improved monitoring and attribution technique. The disclosed embodiments beneficially provide this much-needed improved technique.

Improved Monitoring And Attribution Techniques

In accordance with at least some of the disclosed embodiments, one or more metric counters (e.g., an entity capable of witnessing or counting the amount of work or processing performed by a particular compute node) and one or more metric tracking agents (e.g., a data structure defining a scope by which a compute node's processing is accounted, audited, or otherwise logged, as defined in more detail below) are dynamically added to an event stream processing architecture in order to more accurately and precisely monitor and attribute resource usage to specific compute nodes within the architecture.

Figure 4:
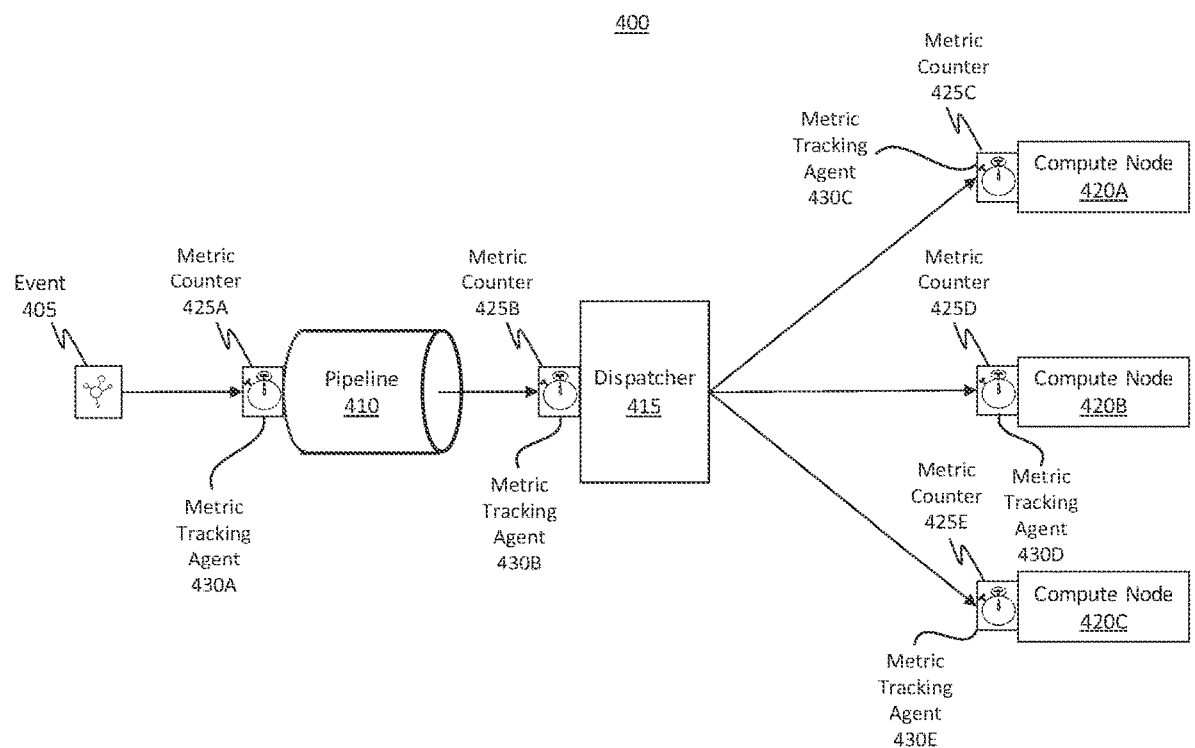
FIG. 4 illustrates the use of a new metric counter (also referred to herein as a metric tracker) that can be associated with the compute nodes and that can be used to specifically monitor the resource usage of each particular compute node so as to better identify which compute nodes expended resources when processing event data.

FIG. 4 shows an architecture 400 that is an example implementation of architecture 300 of FIG. 3. Just like architecture 300, architecture 400 includes an event 405, a pipeline 410, a dispatcher 415, and compute nodes 420A, 420B, and 420C. Architecture 400 also includes one or more metric counters, such as metric counter 425A, 425B, 425C, 425D, and 425E which are associated with metric agents 430A, 430B, 430C, 430D, and 430E, respectively. In some embodiments, metric counter 425A is attached, hooked, or otherwise resident on pipeline 410. In other embodiments, metric counter 425A is transmitted as a part of the metric tracking agent 430A.

In some embodiments, a metric tracking agent (e.g., metric tracking agents 430A-430E) comprises a definition defining a scope of the processes that are to be performed and/or that are to be tracked by a particular compute node, when processing a payload comprising an event and/or in order to generate a payload from processing an event. Furthermore, the metric tracking agent is received at an upstream compute node prior to that upstream compute node performing any processing in response to receiving the event/payload and performing processing on the event to generate a desired payload for a downstream component.

Notably, the metric tracking agent is received at the upstream compute node from a downstream compute node. In some cases, the metric tracking agent may exist on an upstream compute node as an existing policy that was previously received from a downstream compute node or, alternatively, the metric tracking agent is transmitted from a downstream component (at some time previous to the event being received and the payload being processed by the upstream compute node). As an example, dispatcher 415 may be a downstream compute node relative to pipeline 410, which can be considered an upstream compute node. In another case, dispatcher 415 is an upstream compute node relative to compute node 420A, which can be considered a downstream compute node.

After a metric tracking agent is received by an upstream compute node (from a subsequent/downstream compute node), then the upstream compute node can perform its respective processing on a received event/payload in accordance with the defined scope included within the metric tracking agent and in order to generate a desired processed payload. As such, a subsequent/downstream compute node's metric tracking agent can at least partially control which resources within the upstream compute node are monitored while that upstream compute node is processing the payload in response to the event. Furthermore, a metric counter (e.g., metric counter 425A) can be used to monitor the compute node's resource usage in accordance with the scope defined by the metric tracking agent.

In some cases, the metric counter (e.g., metric counter 425A) is inherently resident on a particular compute node and is simply triggered or activated once a metric tracking agent (e.g., metric tracking agent 430A) is received from a downstream compute node. As such, the defined scope provided by the metric tracking agent is able to specify what processing is to be tracked as well as specify how that tracking is to occur (e.g., via use of a particular metric counter).

When a metric counter is resident on a particular compute node, the metric tracking agent is also able to specify which specific metric counter is to be used. That is, a compute node may have any number of resident metric counters (e.g., one or more to counters to count processor cycles, one or more counters to count I/O operations, one or more counters to count network operations, etc.). Accordingly, in some embodiments, the defined scope provided by the metric tracking agent is able to delineate which specific metric counter is to be used when tracking resource usage. The results of the metric counter can then be appended to a log or otherwise included as an artifact to the metric tracking agent, which can then be sent back to the subsequent or downstream compute node.

In other embodiments, the metric counter is included within and is a part of the metric tracking agent that is received from the downstream component, such that it is transmitted between the different compute nodes and is instantiated at the receiving component. For example, in some embodiments, metric counters 425A-E travel with the metric tracking agents 430A-E as those metric tracking agents are transmitted from one compute node to another compute node. By way of example, an upstream compute node (e.g., pipeline 410) can receive metric tracking agent 430A from a downstream compute node (e.g., dispatcher 415), where metric tracking agent 430A comprises a definition or scope of the type of processing that is to be performed or tracked as well as metric counter 425A, which is used to track the compute node's (e.g., pipeline 410) resource usage during the processing. Accordingly, in some cases a metric counter is resident on a compute node while in other cases it is a part of the metric tracking agent. In some embodiments, metric tracking operations can be invoked by performing one or more dispatching operations based on a received metric counter as opposed to a resident metric counter.

According to the disclosed embodiments, it is beneficial for a subsequent/downstream compute node to at least partially control tracking and/or processing of an upstream compute node because it provides an enhanced degree of flexibility for the subsequent/downstream compute node with regard to which processes are performed and tracked. For instance, the upstream compute node may be designed to perform any number of different operations for any number of subsequent/downstream compute nodes, which may all have different operational or processing requirements. These other operations, however, will be largely irrelevant to a particular one downstream compute node. In this case, it is undesirable to attribute an even split in resource usage among all of the different downstream resource nodes because an even split may not accurately reflect the processing performed for and requested by the downstream compute nodes.

Instead, it is desirable to accurately attribute specific computational processing to specific downstream compute nodes, based on the payload that is being requested by downstream compute nodes. By allowing a downstream node to inform an upstream compute node which specific processing is associated with that downstream compute node (where some of the processing may be shared among multiple downstream compute nodes), the processing can then be properly monitored at the upstream compute node and then a specific portion or allocation of the shared processing can be properly attributed to the downstream compute node. In this regard, a downstream component can identify a desired payload with a metric agent that includes or that is associated with a utilization metric counter that will be processed by an upstream compute node. In this manner, the downstream component can identify which processing is to be tracked by the upstream compute node, and according to a predetermined metric counter, while the upstream compute node performs its processing and metric tracking calculation, so as to generate the desired payload and while attributing the correct processing metric value for the processing of the payload.

Through use of these new features, each compute node (e.g., pipeline 410, dispatcher 415, and compute nodes 420A-420C) will have the usage of its own resources monitored and recorded as a metric indicator. As a consequence, the embodiments enable the costs associated with receiving and acting on an event (e.g., including any network fabric I/O operations) to be divided or apportioned in an accurate manner among the various different compute nodes in architecture 400 as opposed to performing a sum-based roll-up resource usage technique (e.g., the lazy technique described earlier). This configuration can provide increased precision and granularity for more accurately attributing actual computational costs (i.e., utilization of network resources) during data processing. This can be particularly beneficial for distributed processing/networks.

For instance, event 405 is to be distributed to three separate compute nodes 420A, 420B, and 420C. Using the different metric counters 425A-425E, the network fabric/piping costs associated with pushing/transmitting event 405 to those three different compute nodes 420A-420C can be accurately apportioned to each of those compute nodes 420A-420C as opposed to being attributed to the publishing entity that published event 405. For instance, the fabric costs for transmitting event 405 can be divided in three ways among compute nodes 420A-420C. Furthermore, any compute usage performed by compute nodes 420A-420C can be accurately determined using the metric counters 425C, 425D, and 425E as opposed to performing a simple even split or roll-up procedure for costs. As will be discussed later, this resource usage allocation/attribution is also beneficial from an optimization viewpoint.

Figure 5A:
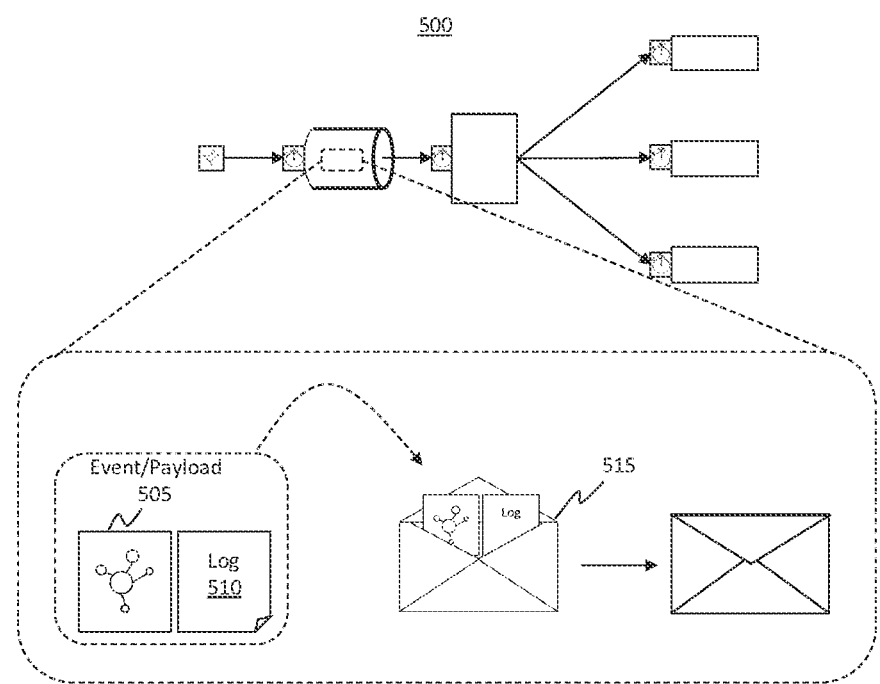
FIG. 5A illustrates a defined scope for processes that are to be performed by an upstream compute node can be wrapped or otherwise associated with a log.

FIG. 5A shows an architecture 500 that is an example implementation of architecture 400 from FIG. 4. Here, a defined scope 505 for a generating a desired payload is wrapped in a wrapper 515 (or otherwise associated) with a log 510. This wrapper 515 may be included as a part of a metric tracking agent.

In accordance with some of the disclosed embodiments, the defined scope 505 can be associated or wrapped together with the log 510, which is used to record or maintain any resource usage of any compute node involved in performing processing on an event to generate a desired payload in accordance with scope 505.

In some implementations, log 510 can be configured to include any number of line items that detail which compute nodes performed which types of computing processes and how much computing occurred, which are performed in accordance with the defined scope 505. In this regard, log 510 can be considered as a list or listing of resource usage metrics that follow scope 505 as it progresses through architecture 500. When a compute node performs a compute operation, the log 510 can be updated or otherwise added/appended to in order to record/log the performed processing. Therefore, in some instances, the metric log record may be modified to include any type of logged metric value.

Wrapper 515 is symbolically visualized as a type of envelope capable of wrapping around scope 505 and log 510. The envelope is illustrated for example purposes only, but it is a useful description. Any time a compute node receives the metric tracking agent (which can include the wrapped scope 505 and log 510), the envelope can be opened, the scope 505 can be extracted, the compute node can be caused to perform a process in accordance with the defined scope 505 in order to generate a desired payload, and the process can be monitored by a metric counter and recorded via the log 510. Additionally, while the compute node is performing its processing, the metric counter (e.g., symbolized as a stopwatch in FIG. 4) is able to count or otherwise record the amount of processing/resource utilization the compute node expends while performing its processing in accordance with the defined scope 505. The metric counter is able to incrementally calculate a metric value of the compute node, which can be a physical or logical processing unit, as the compute node performs its processing in response to the event and in accordance with the scope 505. In some embodiments, instead of incrementing a value, the metric counter can determine a delta value that is present between two different states, conditions, or metrics. For example, in some embodiments, the metric counter can identify or determine a before metric and can identify or determine an after metric. By comparing and contrasting these two metrics (e.g., by performing a subtraction process), the metric counter can determine the delta change between those two metrics. In this regard, the metric counter can incrementally calculate the metric value or, alternatively, it can determine that metric value by computing a delta value between two detected metrics.

As used herein, metric log 510 (or any other type of metric "log") can be considered a type of "artifact" included within a metric tracking agent (or a wrapper 515 of the metric tracking agent). As such, the artifact is not limited simply to a log, but rather may include any type of recording unit capable of maintaining information regarding resource usage, e.g., meta-data, table, data field, etc. This artifact is configured to travel with the metric tracking agent throughout the architecture 500. In this regard, the metric values calculated by different metric counters and maintained by different logs can be linked to specific compute nodes.

While FIG. 5A symbolically showed wrapper 515 as a type of envelope wrapped around an event, use of a metric tracking agent or wrapper 515 is not limited only to event-based processing. That is, some architectures or systems may not be able to symbolically wrap an envelope around a scope and log. As an example, consider a scenario in which a read I/O is being performed on a disk. In such a scenario, the read data may not have a slot or field available to associate a log/artifact with the payload. To address such scenarios, in some cases, a payload may not be directly associated with a metric log or metric artifact and instead the payload may be indirectly associated with the artifact (e.g., such as via an unconnected or disassociated database or record management system capable of indirectly monitoring resource usage).

Figure 5B:
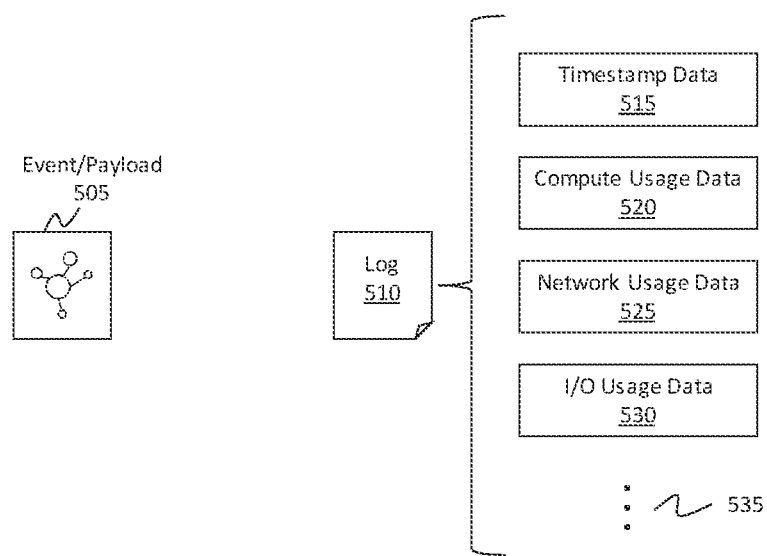
FIG. 5B illustrates different types of data that can be included within a log, where the different types of data are defined via a scope associated with the log.

FIG. 5B shows additional detail regarding log 510. In some instances, log 510 can record metrics focused or directed to timestamp data 515 (e.g., detailing when a process started and/or stopped), compute usage data 520 (e.g., detailing the number of processor ticks or cycles used to perform a process/action), network usage data 525 (e.g., detailing how much network fabric was used), and/or I/O usage data 530 (e.g., detailing how many network or disk operations were performed or any other type of storage operations). The ellipsis 535 shows how any other type of compute processing may be monitored, logged, and/or recorded by log 510. The content that is to be recorded in log 510 is defined by scope 505 provided within the metric tracking agent. Further, log 510 may include any number of mutable fields or sections for appending additional information. For instance, log 510 may include a field used to list the source/publishing entity where the event came from (e.g., a trace of related entities). Additionally, log 510 may include a listing of all previous compute nodes that performed processes on the event, where the listing includes how much resources were used by those compute nodes. It will be appreciated that metric data may be collected for any type of physical or logical compute node.

Either after an event is fully processed by all associated compute nodes, or, alternatively, at different periods while the event is being progressively processed by any number of different compute nodes, the contents of log 510 may be provided to a usage attribution engine (illustrated later) to enable resource usages to be accurately and precisely attributed to and billed to the corresponding compute nodes. The usage attribution engine (e.g., a type of metric store) is also able to provide feedback regarding areas within the architecture where optimizations may be performed so as to improve the flow and efficiency of the architecture. In some cases, the usage attribution engine is also able to automatically and autonomously perform one or more of those optimizations on the architecture.

As a brief example with reference to FIG. 4, if (based on the collected metric information) it is determined that moving the computations of compute node 420A from the right side of architecture 400 to a position closer to pipeline 410 will result in improved efficiencies, then the usage attribution engine may be configured to automatically implement such a move so as to improve the efficiency of those operations. In other cases, throttling can be performed on one or more compute nodes as a part of an optimization process. In some embodiments, the usage attribution engine does not directly perform the optimizations, but rather controls one or more other computing devices to perform the optimizations. In this regard, the usage attribution engine can operate as an oracle, overseer, or master node controlling the processes of one or more slave or client nodes.

Figure 6:
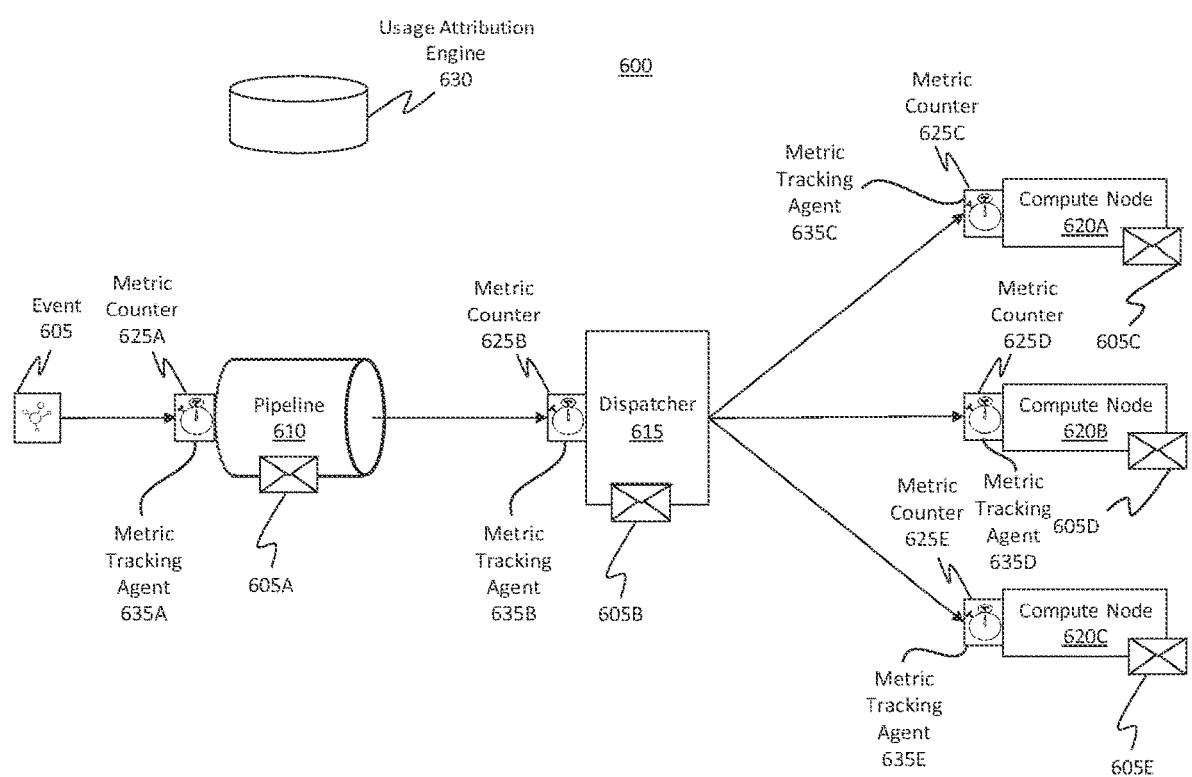
FIG. 6 illustrates an improved architecture that uses multiple different metric counters and metric tracking agents in order to monitor and track specific resource utilization.

FIG. 6 shows another architecture 600, which is representative of architecture 500 and 400 from FIGS. 5 and 4, respectively. Architecture 600 includes an event 605, a pipeline 610, a dispatcher 615, compute nodes 620A, 620B, and 620C. Architecture 600 also includes metric counters 625A, 625B, 625C, 625D, and 625E. These metric counters can be resident on each compute node or, alternatively, they can be included within a respective metric tracking agent, as discussed earlier. Furthermore, the metric counters 625A-625E are associated with different metric tracking agents 635A, 635B, 635C, 635D, and 635E, which are used to define different respective scopes for each of the downstream compute nodes. These metric tracking agents can be passed between the different compute nodes in order to determine which processes are to be monitored so as to properly attribute resource usage to the different compute nodes. That is, each downstream compute node can pass a corresponding metric tracking agent to an upstream compute node to inform the upstream compute node which processes are to be performed and are to be tracked in order to generate a desired payload, where the processes and tracking are defined within a scope provided by the metric tracking agent. Additionally, each metric tracking agent may include a log that is associated (or wrapped) with the defined scope. Additionally, architecture 600 includes a usage attribution engine 630 capable of performing the operations described earlier.

As shown in FIG. 6, pipeline 610 receives event 605 and performs one or more processes on event 605. Additionally, any resources used by pipeline 610 (i.e., its "resource usage") will be recorded by metric counter 625A and logged, entered, or otherwise included in the log associated with metric tracking agent 605A. It will be appreciated that the disclosed metric tracking agents can travel through the architecture in both an upstream manner and a downstream manner, based on different requests submitted by the different compute nodes.

For example, metric tracking agent 635A is transmitted from a subsequent compute node, namely dispatcher 615, and received at pipeline 610. Metric tracking agent 635A is able to (i) inform pipeline 610 which processing to perform on event 605, (ii) determine how much of that processing is to be tracked, (iii) record how much processing pipeline 610 is currently performing on the event to generate a payload, and then (iv) append new usage data to the log.

In some embodiments, a metric counter can also determine how much processing was used by the network fabric located in between different compute nodes (e.g., pipeline 610 and dispatcher 615), where the network fabric was used to transmit the payload resulting from an event being processed. This so-called fabric usage can also be included or appended to the log included within a metric tracking agent. Accordingly, a log associated with a metric tracking agent can operate as an operational log for any processes that occur in architecture 600. In some cases, a metric tracking agent can be considered to be an event-only log structure that logs compute expenditure. Furthermore, in some cases, a metric tracking agent contains all of the charges incurred as the event/payload data travels through architecture 600.

With the lazy technique described earlier, resources are expended (e.g., pipeline 610 is expending resources, the in-between fabric infrastructure is expending resources, etc.), but those resources were not associated with, or rather are not attributed to, any particular type of stimulating event. Instead, the generalized/overall cost was simply rolled up through the hierarchy. This occurs because different isolation units, or boundaries, are involved with each of the different compute nodes and because the lazy technique cannot respond appropriately to these different isolation boundaries.

In contrast to the above-described lazy technique, the disclosed embodiments are able to associate resource usage with specific stimuli and with specific compute nodes, even when isolation boundaries are present in the network (as will be discussed in more detail later). As such, each compute node is charged only for the resources it consumes. While the lazy technique often disincentivizes entities to continue publishing events (e.g., because they are heavily overcharged), the current embodiments promote use of the network/architecture because they accurately and precisely allocate costs to where they are due. Furthermore, by performing the disclosed operations, cost allocations may be performed at a more granular level as compared to other techniques.

When the processing on an event is complete, or, alternatively, at selected instances during the progressive processing of the event, the logged metric content included in a metric tracking agent can be discharged to the usage attribution engine 630. As described earlier, usage attribution engine 630 is responsible for compiling the logged metric resource usage information, attributing the resource usage with specific compute nodes, and dividing the incurred expenses among those compute nodes. In some cases, usage attribution engine 630 also performs optimizations on the architecture 630. Additionally, usage attribution engine 630 can be considered as a type of metric store or metric database, similar to that which was described in connection with FIG. 1 (e.g., see metric database 145).

Figure 7A:
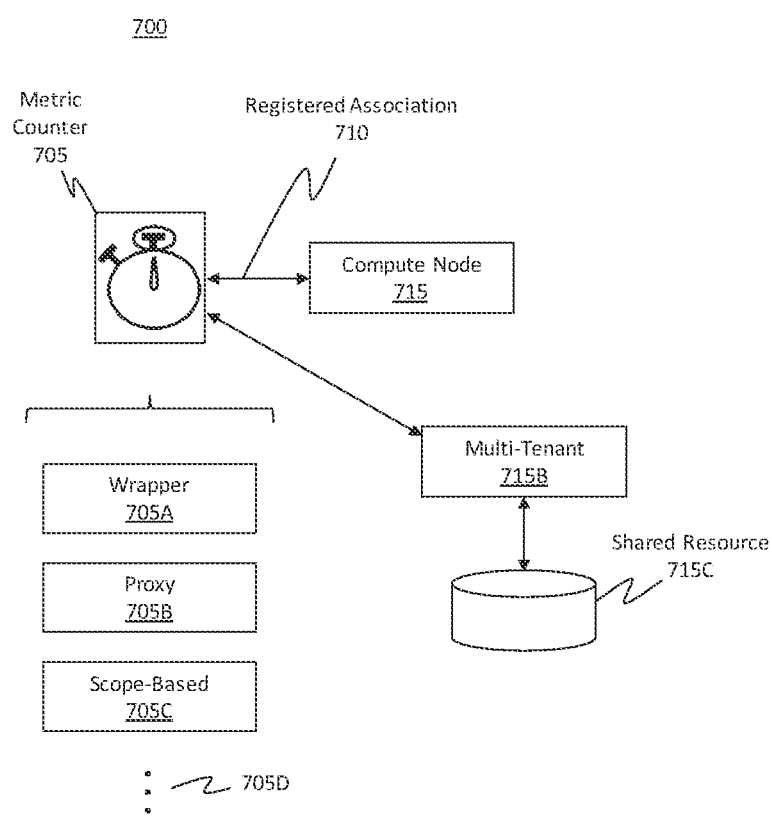
FIG. 7A illustrates some examples of how a metric counter may be implemented and how the metric counter can have a registered association with a compute node.

FIG. 7A provides an example scenario 700 detailing how a metric counter 705 may be implemented in practice. Initially, it is noted that a metric counter 705 may have a registered association 710 with a compute node 715 (e.g., pipeline 610, dispatcher 615, and/or compute nodes 620A-620C from FIG. 6). By registered association, it is generally meant that a metric counter can be individually linked or otherwise associated with a particular compute node. Furthermore, a metric counter can be created/instantiated dynamically (e.g., in real-time) in response to the receipt or identification of an incoming metric tracking agent. Therefore, in some embodiments, metric counters may be specifically linked or related to events. Further, a single compute node may have any number of metric counters, with each metric counter being tied to or related to a particular one or type of event/payload included within a metric tracking agent. In some cases, metric tracker 705 can operate with or in a multi-tenant framework, as shown by the association between metric tracker 705 and multi-tenant system 715B. For instance, metric tracker 705 may be dynamically instantiated or otherwise associated with metric counters provided within the multi-tenant system 715B. Here, the compute nodes in the multi-tenant system 715B are operating on a shared resource 715C. Therefore, in at least some embodiments, accounting or metric usage data can be discharged to a specific tenant within multi-tenant system 715B, where that specific tenant is using the shared resource 715C.

Additionally, in some embodiments, a metric tracking agent may be registered with a compute node or system boundary (to be described in detail later). As such, the metric counter and/or the metric tracking agent may have a registered association with compute nodes and with the usage attribution engine.

While in some cases, new metric counter instances may be dynamically and in real-time instantiated based on the arrival of a metric tracking agent, in other cases a metric counter may be statically associated with a compute node. That is, a compute node may include one or more metric counters that are configured to receive any type of metric tracking agent. In this regard, at least some metric counters can be considered to be polymorphic entities capable of handling and processing any type of metric tracking agent. Accordingly, a metric counter is a robust and highly flexible type of performance/metric counter that can track any type of metric (e.g., time used, subscriptions serviced, processor cycles used, tokens used, or any other incrementally updatable value) and that can be instantiated on a per-event basis or on a static basis.

To form the registered association 710, compute node 715 can register with the usage attribution engine (e.g., usage attribution engine 630 from FIG. 6) and request a metric counter application to be downloaded thereon. Then, any time a metric tracking agent is received, a new instance of the metric counter can be instantiated and used to collect the metric information, as described earlier. During the registration process, compute node 715 can inform the usage attribution engine of the types of information it processes (e.g., its subscription data) as well as the types of processing operations it performs. As such, the instantiated version of metric counter 705 associated with compute node 715 can be individually customized based on the registered information. Alternatively, the metric counter may be included as a part of the metric tracking agent and can be configured by the agent in any manner.

Metric counter 705 can be implemented, or rather encoded, in any number of different ways. For instance, metric counter 705 can be in the form of a wrapper 705A, a proxy 705B, or a scope-based entity 705C. The ellipsis 705D shows how metric counter 705 can take on any other form suitable for monitoring the processes of compute node 715.

When in the form of wrapper 705A, metric counter 705 wraps around compute node 715 and closely monitors the operations of compute node 715. As such, metric counter 705 is aware of any incoming messages, outgoing messages, and internal processing of compute node 715. In this regard, the previously-described registration process may include the metric tracking agent operating as a wrapper around the compute node 715.

When in the form of proxy 705B, metric counter 705 is also able to monitor the processes of compute node 715, but does so using any proxy technique generally known in the art. Similarly, when in the form of scope-based entity 705C, metric counter 705 is able to scope (e.g., call or query a compute node to acquire information from that node) incoming and outgoing messages and monitor processes of compute node 715.

Figure 7B:
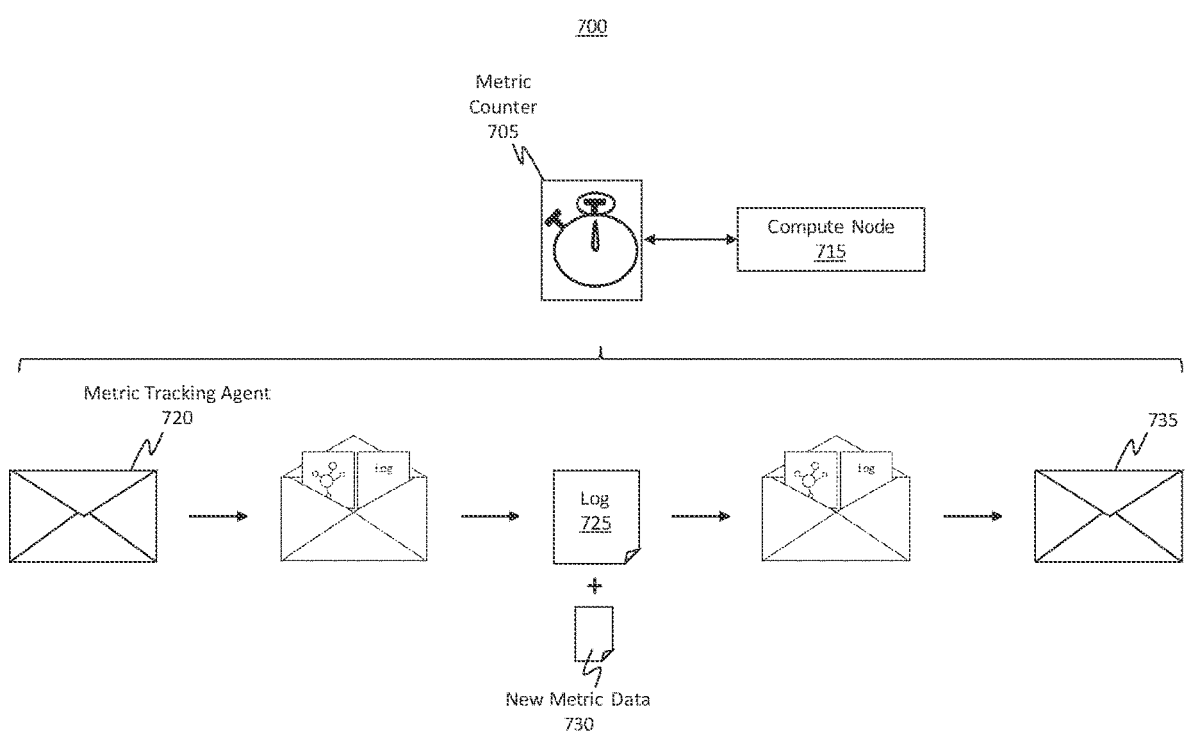
FIG. 7B illustrates some of the example operations of a metric counter and how the metric counter can work in conjunction with a metric tracking agent.

FIG. 7B shows an example operation of metric counter 705. For instance, when an incoming metric tracking agent 720 is received at compute node 715, metric counter 705 can symbolically "open" metric tracking agent 720 to extract its scope and its log 725. Compute node 715 then performs one or more processes/actions in response to the event and in accordance with the defined scope. During these processes, metric counter 705 monitors compute node 715's resource usage and appends new metric data 730 to the log 725. Metric counter 705 then repackages the metric tracking agent and transmits it as an updated metric tracking agent 735 to a subsequent compute node. In this manner, the compute/resource usage of compute node 715 can be closely monitored and charged accordingly.

Metric counter 705 can monitor any type of processing performed by compute node 715. For instance, it is able to count processor ticks, processor cycles, the number of bytes going into and out of compute node 715, an amount of I/O expended or used by compute node 715, and/or any other resource usage of compute node 715. Accordingly, metric counter 705 can be hooked onto compute node 715 to monitor compute node 715's performance. Furthermore, metric counter 705 can be implemented without changing the infrastructure of the compute node 715. For instance, when a metric tracking agent arrives, the metric counter can extract monitor the processes of the compute node without requiring any modifications to the compute node.

Figure 8:
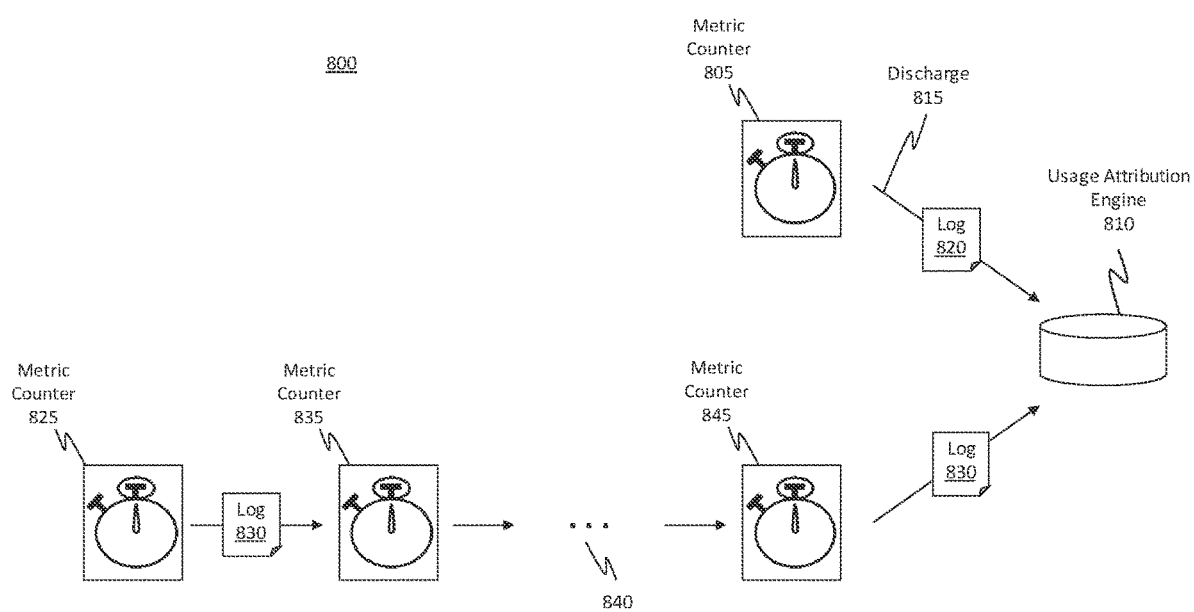
FIG. 8 illustrates how, in some cases, information obtained using a metric counter (e.g., resource usage data) can be directly discharged to a usage attribution engine (e.g., a kind of database or metric store) or, alternatively, how child/nested metric counters or metric tracking agents can discharge their usage data up a chain of metric counters or metric tracking agents until a particular metric counter or metric tracking agent has sufficient permissions to discharge the usage data to the usage attribution engine.

FIG. 8 shows an example scenario 800 in which metric counters are able to discharge their logged metric data to the usage attribution engine. Specifically, FIG. 8 shows that in some instances, a metric counter 805 is able to communicate directly with a usage attribution engine 810 to discharge 815 logged metric data 820. That is, regardless of where metric counter 805 is disposed within a network/architecture, metric counter 805 is able to communicate directly with usage attribution engine 810 to offload or discharge the collected information. In such scenarios, therefore, the resource usage of a compute node can be discharged any number of times and need not wait until the event is fully processed. In some implementations, the logged metric data 820 can be pushed to the usage attribution engine 810 while in other implementations the usage attribution engine 810 reaches out to a metric tracking agent or metric counter and polls the logged metric data 820 therefrom.

In another scenario, there may be multiple nested child/parent metric counters, and the discharge process goes from child to parent until such time as a parent has permissions or functionality suitable to discharge the logged metric data to the usage attribution engine 810. For instance, metric counter 825 can be considered as a child metric counter. Metric counter 825 discharges its logged metric data 830 to its parent metric counter 835. Metric counter 835 then discharges its logged metric data to its parent and so on, as shown by ellipsis 840, until parent metric counter 845 discharges all of the collected logged metric data 830 to usage attribution engine 810. Accordingly, all types of resource usage (e.g., CPU processing, memory, networking, etc.) can be logically combined into a value and associated with and attributed to specific logical consumption units (i.e., compute nodes) so that the compute nodes can be properly billed. In some cases, different metric counters may be used for CPU processing, memory I/O, and networking such that any number of different metric counters may be used to specifically monitor different types of resource usage.

With reference to FIG. 6, metric counter 625C may discharge its logged metric data to metric counter 625B which may then discharge its logged metric data to metric counter 625A. Then, metric counter 625A can discharge all of the logged metric data to usage attribution engine 630. Such embodiments may be beneficial in situations where the child metric counters are far (in network location terms) from the usage attribution engine 630 and where it will cause less bandwidth to be consumed by simply passing the logged metric data back through a selected number of parent metric counters as opposed to sending the logged metric data directly to usage attribution engine 630. Accordingly, any logged metric values may be provided to a usage attribution engine or metric store. In some cases, this may occur prior to a processed payload being provided to a subsequent compute node or system boundary.

In FIG. 8, after any number of logged metric data discharges occur, then the usage attribution engine 810 can identify which processes were most expensive (e.g., resource-wise). The usage attribution engine 810 can provide these details via feedback to a user or, additionally or alternatively, implement one or more optimizations, as described earlier. Furthermore, costs are no longer simply summed up (as in the lazy technique), but the disclosed embodiments also now enable costs to be split/divided among multiple different compute entities. It will be appreciated that the process of splitting or allocating costs to the different compute nodes may be performed at different times or levels. As an example, the discharging processes (which are used or relied on to allocate costs) and/or the usage data can be split prior to the usage data reaching the usage attribution engine 810. In other cases, post-processing can be performed to split the discharging process or the usage data.

Additionally, it has been found that publishing entities (e.g., the publisher of event 605 in FIG. 6) often unnecessarily and repeatedly publish the same event. Consequently, many resources are used in a wasteful manner. In such cases, it may be beneficial to shift costs from compute nodes, which are performing processing on the same events, to the publisher who is wastefully publishing the same events. In this regard, the usage attribution engine 810 can examine all of the logged metric information and can determine when publishing entities are performing wasteful operations. The usage attribution engine 810 can then shift more of the overall costs to the publishing entity in the form of a penalty fee in an attempt to discourage the publishing entity from wastefully publishing event data.

Additionally, the usage attribution engine 810 can provide feedback to the publishing entity to alert the entity of its wasteful publishing activities. Such feedback can also encourage owners of the front-end compute nodes (e.g., pipeline 610 and dispatcher 615 in FIG. 6) to periodically reevaluate their computing structures to determine whether those structures can also be improved.

As an example, suppose pipeline 610 in FIG. 6 is heavily laden with a large number of events. Because pipeline 610 is using so much bandwidth/resources to process its many events, pipeline 610 may be charged with excess bandwidth fees. By providing feedback to the owners of pipeline 610 or at least by identifying the condition recited above, one or more optimizations may be performed on pipeline 610. As an example, pipeline 610 may be partitioned into multiple pipelines, each of which handles significantly less events than the overall amount previously handled by the one pipeline 610 (e.g., the events are also partitioned, redirected, or otherwise dispersed through the newly formed pipelines). Even though more pipelines are present, the optimized pipelines will no longer be charged with excess bandwidth fees such that the overall costs can be reduced (even though more compute nodes are in the architecture). Accordingly, the disclosed embodiments may also be used to improve overall efficiency of the architecture/system by identifying those compute nodes that are the most expensive and by optimizing those expensive compute nodes.

In some cases, logical boundaries may be present between compute nodes. The embodiments are able to beneficially instrument the resource monitoring/auditing process within these limited boundary areas, as will now be described with respect to FIG. 9.

Network Boundaries

Figure 9:
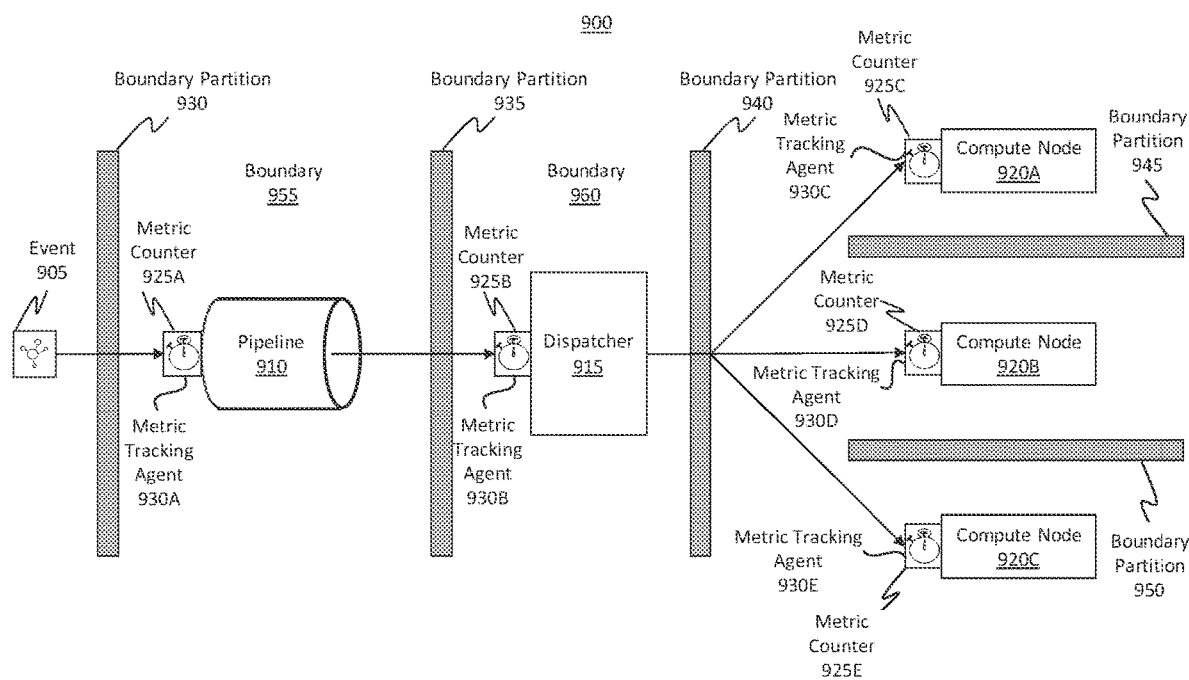
FIG. 9 illustrates how an architecture may be subdivided into different boundaries and how any amount of resource usage can be accurately and precisely attributed to each separate boundary.

FIG. 9 shows an example architecture 900, which may be an example implementation of architecture 600 from FIG. 6. Architecture 900 includes an event 905, a pipeline 910, a dispatcher 915, compute nodes 920A, 920B, and 920C, as well as metric counters 925A, 925B, 925C, 925D, and 925E that are associated with metric tracking agents 930A, 930B, 930C, 930D, and 930E. These entities are similar to those that were discussed in connection with the earlier figures.

Also shown are boundary partitions 935, 940, 945, and 950. These boundary partitions may be logical partitions isolating each compute node from the other compute nodes. Furthermore, the boundary partitions may be formed through use of the different metric counters 925A-925E and/or metric tracking agents 930A-930E. That is, by hooking or otherwise associating a metric counter with each logical compute node/unit or with a collection of multiple compute nodes, these compute nodes/units can be view as being isolated from one another, thereby forming different boundaries between the different boundary partitions. These boundaries can help with understanding how resource usage can be attributed to each individual node or collection of nodes. Use of the term "boundary" can also generally refer to any type of communication across compute nodes (e.g., via a networking stack or TCP/IP protocol).

For instance, any resource usage that occurs within boundary 955, which is formed by boundary partition 935, may be attributed to pipeline 910, as monitored and recorded by metric counter 925A and as defined via the scope associated with metric tracking agent 930A (which was transmitted from a downstream compute node to pipeline 910). Similarly, any resource usage that occurs within boundary 960, which is formed by boundary partitions 935 and 940, may be attributed to dispatcher 915, as monitored and recorded by metric counter 925B. The other boundaries formed by the other boundary partitions may be monitored in a similar manner. It will be appreciated that a boundary may comprise one or more different compute nodes. Therefore, while FIG. 9 shows boundary 955 as including only pipeline 910, other boundaries may include more than one compute node. Additionally, the boundary partitions (e.g., boundary partitions 935, 940, 945, and 950) may be thin (e.g., object references are used as the dividing source) or thick (e.g., a network pipe is used as the dividing source).

Some embodiments can also account for any shared usage of fabric infrastructure (e.g., the fabric between pipeline 910 and dispatcher 915). For instance, some of the middle fabric resource usage may be determined by comparing and contrasting the logged metric data within a metric tracking agent.

To illustrate, when a metric tracking agent is passed from boundary 955 to boundary 960, the fabric networking costs can be determined by initially (e.g., before any processing is performed by dispatcher 915) subtracting monitored costs as initially recorded in boundary 960 from the costs as recorded in boundary 955. This subtraction process can be used to determine the costs incurred as a result of using network fabric to transmit the network tracking agent from one boundary to another (e.g., from pipeline 910 to dispatcher 915). Accordingly, in some cases, resource usage can be monitored and recorded even while a metric tracking agent is in transit from one boundary to another boundary. Furthermore, the fabric costs can then be divided (e.g., either equally or by differing percentage values such as in accordance with an established service agreement or based on a defined policy) between the different compute nodes/boundaries.

Generating And Monitoring New Events

Figure 10:
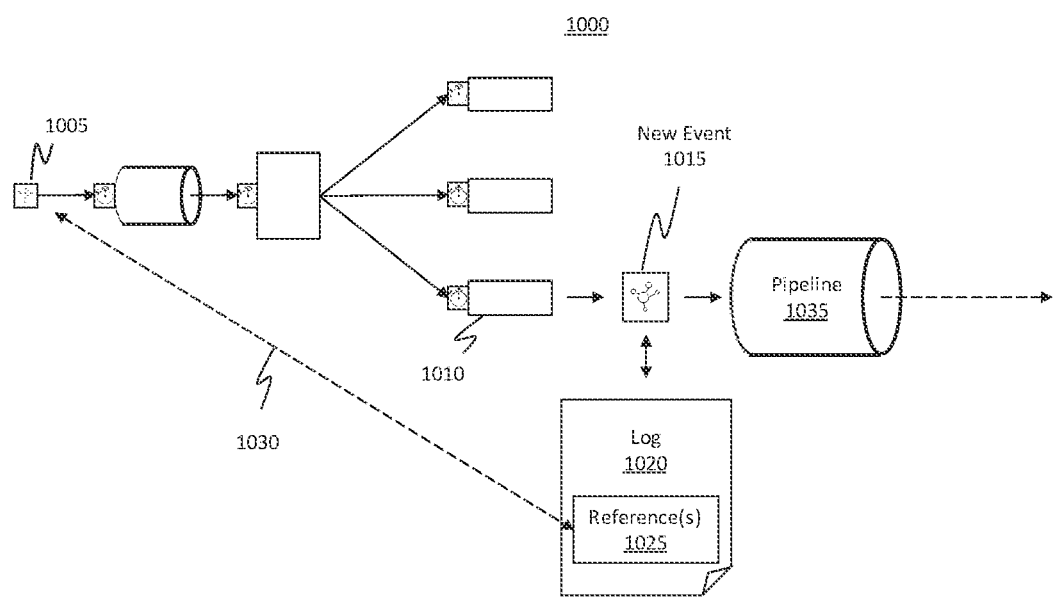
FIG. 10 illustrates an example scenario in which a compute node performs processing on event data and, as a result of this processing, a new event is spawned. In such scenarios, a reference may be linked or otherwise associated with the newly spawned event in order to correlate the new event with the old event in order to accurately monitor and attribute resource usage for the newly spawned event as well as the old event.

In some cases, a downstream compute node (e.g., compute node 920A is downstream of dispatcher 915 in FIG. 9) can cause a new event to be generated. When this occurs, it may be desirable to associate the newly created event with the original event that stimulated the creation of, or rather that triggered the spawning of, the new event. To do so, the new event can be configured to include a reference to the original stimulating event so as to properly account or link the different resource usages. FIG. 10 shows such a scenario.

FIG. 10 shows an example architecture 1000, which is an example implementation of architecture 900 from FIG. 9. Although not labeled, architecture 1000 includes various different compute nodes, all of which are performing operations in response to receiving an event/payload 1005.

Compute node 1010 is specifically shown as performing a process in response to event 1005. As a part of this process, a new event 1015 is created or spawned. Although new event 1015 is different than event 1005, it may be desirable to link new event 1015 to event 1005 because new event 1015 was created as a result of work being performed in connection with event 1005. Therefore, when new event 1015 is processed in accordance with a downstream compute node's metric tracking agent, the log 1020 (or other artifact) of that metric tracking agent is augmented or supplemented with additional information, namely a reference 1025. Reference 1025 causes a link 1030 to be established between event 1005 and new event 1015. Therefore, when new event 1015 gets propagated to other compute nodes (e.g., pipeline 1035), any costs or resource usage expended in connection with processing new event 1015 can be at least partially attributed to event 1005. It will be appreciated that reference 1025 can be used to define a causal relationship between the different events. In some cases, this causal relationship may be one-to-one (as described above) while in other cases this causal relationship may be many-to-one, where a combination of multiple previous events led to the spawning of a new event. For instance, an outgoing event may be the result of combining multiple incoming events, and costs associated with the outgoing event may be divided among the multiple incoming events.

In this regard, newly spawned events can be associated with old events in order to accurately and precisely attribute costs to certain stimuli (e.g., the old event). It will be appreciated that reference 1025 can be any type of reference, such as, for example, a hyperlink included within log 1020, descriptive information at least identifying event 1005 as being the originating event, and/or any other information suitable to create the link 1030 between the two events. Accordingly, any type of causal relationship may be used to reference or link events. Such a relationship may be maintained in and referenced from a relational table or other data structure that is stored by or accessed by the system.

In some cases, the link 1030 may be established not by specifically identifying event 1005 directly, but rather is established in an indirect manner by identifying all of the compute nodes that event 1005 passed through prior to new event 1015 being spawned. In this regard, event 1005 and new event 1015 may partially share a same event processing history, and these histories may be used to identify the connection between the two events.

Additionally, reference 1025 may include any other type of identifying information. Accordingly, reference 1025 can be used to track any type of causal relationship or action that led up to the generation of new event 1015.

Example Method(s)

Attention will now be directed to FIGS. 11A, 11B, 12, and 13, which refer to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These method acts generally outline some of the processes that were discussed in connection with the earlier figures.

Figure 11A:
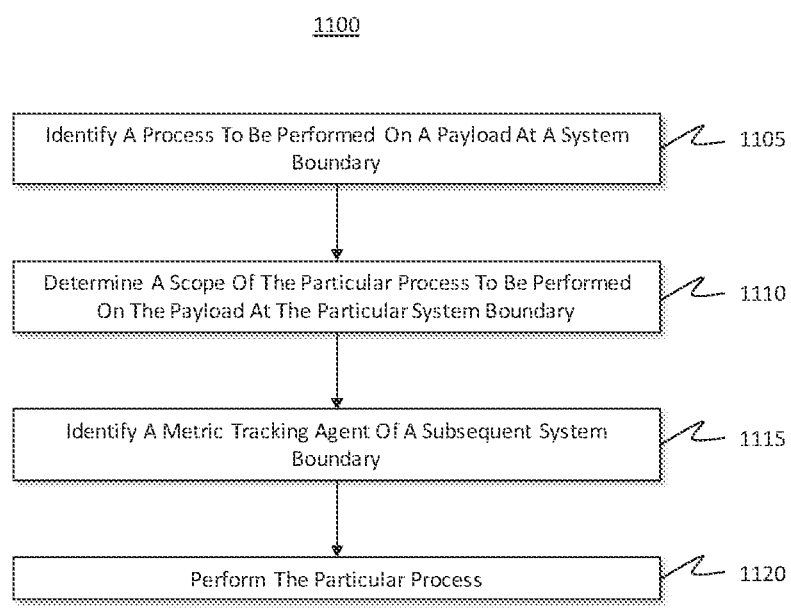
FIGS. 11A and 11B illustrate a flowchart of an example method for accurately attributing resource usage to different boundaries within a network.
Figure 11B:
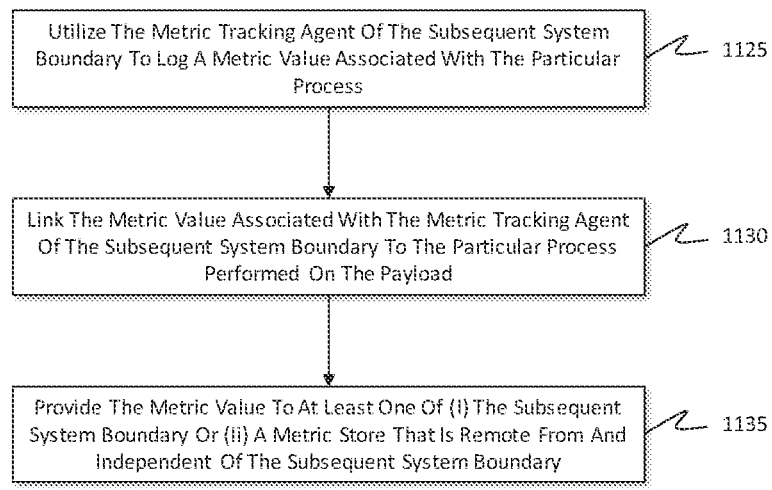

FIGS. 11A and 11B illustrate a flowchart of an example method 1100 for utilizing one or more metric tracking agents (e.g., metric tracking agent 720 from FIG. 7B) to track usage or utilization of resources (e.g., resources used by a compute node such as compute node 715 from FIG. 7A). These resources are used to process events or other types of payloads in accordance with a scope, which is transmitted across different boundaries (e.g., boundaries 955 and 960 from FIG. 9) within a network/architecture (e.g., architecture 900).

Initially, method 1100 includes an act 1105 of identifying a particular process (e.g., process 225 from FIG. 2A) to be performed on a payload at a particular system boundary. In some cases, this identification is performed prior to the payload being provided as a processed payload to a subsequent system boundary within a network that includes a plurality of system boundaries, each of which is structured or configured to process at least a portion of the payload.

Method 1100 also includes act 1110 of determining a scope of the particular process to be performed on the payload at the particular system boundary. This determination process may also be performed prior to the processed payload being provided to the subsequent system boundary. In some embodiments, the scope is determined by specifying which processes are to be performed to generate a desired payload and which processes are to be tracked.

Next, method 1100 includes an act 1115 of identifying, at the particular system boundary, a metric tracking agent of the subsequent system boundary. For instance, the metric tracking agent may include a log or artifact that is being updated by the current system boundary's metric counter and that is to be passed to the subsequent system boundary. In some cases, identifying the metric tracking agent is performed by the particular system boundary requesting the metric tracking agent from the subsequent system boundary.

In some cases, the metric tracking agent is specific to the scope of the particular process to be performed at the particular system boundary. For instance, the metric tracking agent may be configured to specifically monitor the operations of the current system boundary in the manner described earlier. Additionally, the metric tracking agent may be associated with a metric counter that incrementally calculates a metric value of any physical and/or logical processing units associated with performing the particular process at the particular system boundary. In act 1120, the particular process is then performed within the system boundary.

FIG. 11B shows some additional operations that may be included in method 1100. For instance, method 1100 may include an act 1125 of utilizing the metric tracking agent of the subsequent system boundary to log the metric value associated with the particular process being performed at the particular system boundary. That is, the metric tracking agent, which includes a log or audit of the processing performed by one or more system boundaries, can be used to record how much processing each boundary performed in response to performing processing on an event to generate a desired payload (where the processing was calculated or monitored by a metric counter). This determination can then be relied on to calculate, or rather attribute, costs to each system boundary. In some cases, the metric value identifies (i) a unit of physical resources consumption, (ii) a CPU cycle count, or (iii) a logical unit of resource consumption associated with networking or any other compute operation.

Method 1100 also includes an act 1130 of linking the metric value associated with the metric tracking agent of the subsequent system boundary to the particular process performed on the payload. In some embodiments, the metric value is linked to the particular process as a metric artifact that is provided to the subsequent system boundary with the processed payload. In some embodiments, the metric value is linked to the particular process as a metric artifact that is provided to the subsequent system boundary in a wrapper around the processed payload. In some embodiments, the metric value is linked to the particular process as an appended metric value that is provided to the subsequent system boundary with one or more other metric values associated with one or more different metric tracking agents that identified the one or more other metric values during previous processing of the payload in the network.

Then, in act 1135, the metric value is provided to at least one of (i) the subsequent system boundary or (ii) a metric store (e.g., the usage attribution engine 810 from FIG. 8) that is remote from and independent of the subsequent system boundary. In some cases, method 1100 further includes the particular system boundary providing a different metric tracking agent to a prior system boundary to use in calculating a different metric value associated with performing a prior process on the payload and prior to identifying the particular process to be performed on the payload. Here, the different metric value is associated with the payload in a metric record by the prior system boundary.

Figure 12:
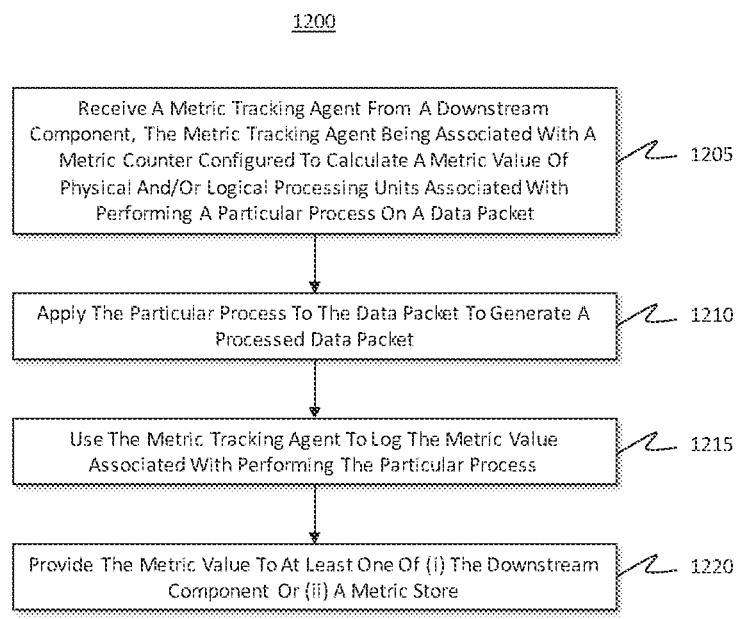
FIG. 12 illustrates a flowchart of an example method detailing how resource usage can be accurately attributed from the perspective of an upstream component within a network.

FIG. 12 illustrates a flowchart of an example method 1200 for tracking computational usage in a network that includes one or more upstream components that process data for one or more downstream components. Initially, method 1200 includes an act 1205 of receiving, at an upstream component that receives a data packet to be processed with a particular process for a downstream component, a metric tracking agent from the downstream component. In this case, the metric tracking agent can be associated with a metric counter configured to calculate a metric value of physical and/or logical processing units associated with performing the particular process.

Then, at the upstream component, there is an act 1210 of applying the particular process to the data packet to generate a processed data packet. The upstream component also uses (act 1215) the metric tracking agent to log the metric value associated with performing the particular process. Finally, the upstream component provides (act 1220) the metric value to at least one of (i) the downstream component or (ii) a metric store.

In some cases, one or more optimizations are performed on the network based at least partially on the metric value. As an example, these optimizations may include moving one or more compute nodes included within the downstream component to the upstream component. In some cases, optimizations may be performed locally (e.g., shuffling resources across upstream and downstream boundaries) on a specific compute node while in other embodiments optimizations may be performed in a global manner across the entire architecture. Of note, gathered metric data can be leveraged by a wide range of optimizers that are configured to perform various different types of local and global optimizations (e.g., rebalancing resources, rebalancing loads, splitting compute nodes, partitioning pipelines, etc.).

Figure 13:
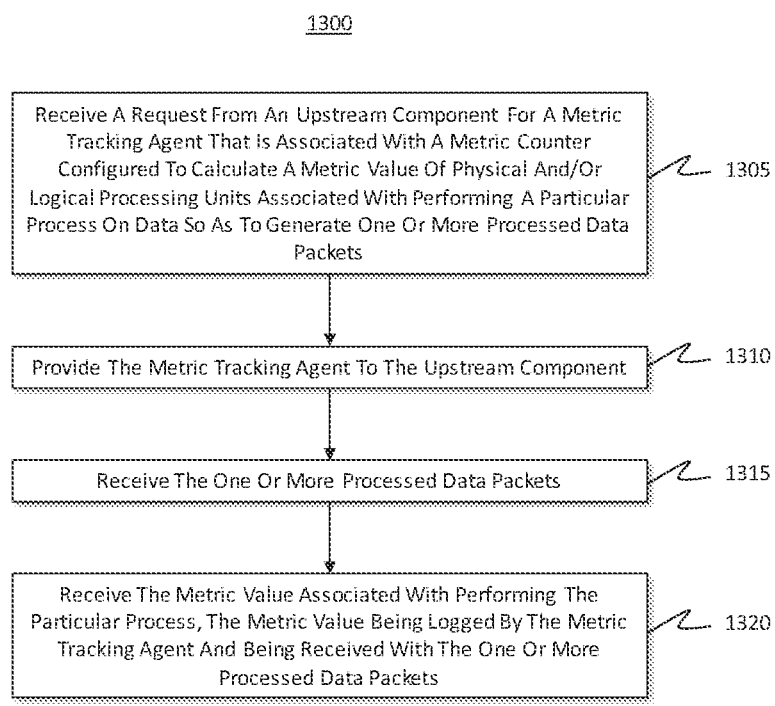
FIG. 13 illustrates a flowchart of an example method detailing how resource usage can be accurately attributed from the perspective of a downstream component within a network.

FIG. 13 illustrates another flowchart of an example method 1300 for tracking computational usage in a network that includes one or more upstream components that process data for one or more downstream components. At a downstream component that receives one or more processed data packets from an upstream component, method 1300 includes an act 1305 of receiving a request from the upstream component for a metric tracking agent that is associated with a metric counter configured to calculate a metric value of physical and/or logical processing units associated with performing a particular process on data for generating the one or more processed data packets for the downstream component. Then, the downstream component provides (act 1310) the metric tracking agent to the upstream component.

The downstream component also receives (act 1315) the one or more processed data packets and also receives (act 1320) the metric value associated with performing the particular process, where the metric value is calculated by the metric counter and logged by the metric tracking agent and where the metric value is received with the one or more processed data packets.

Similar to before, one or more optimizations may be performed on the network based at least partially on the metric value. These optimizations may include moving one or more compute nodes included within the upstream component to the downstream component.

Accordingly, the disclosed embodiments may be used to solve many of the problems prevalent in the current technology. By practicing the disclosed principles, costs may be charged in a more accurate and precise manner and optimizations may be performed to improve how the system functions.

Example Computer System(s)

Figure 14:
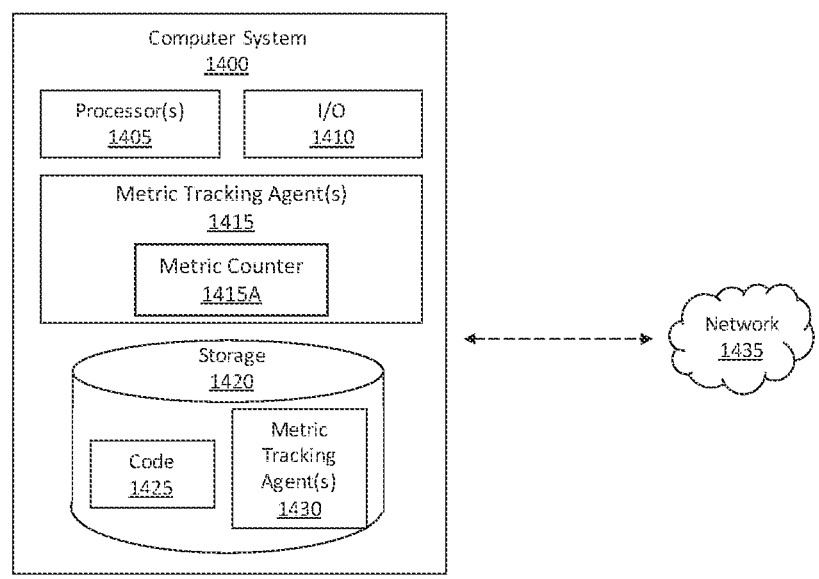
FIG. 14 illustrates an example of a computer system capable of performing any of the disclosed operations.

Attention will now be directed to FIG. 14 which illustrates an example computer system 1400 that may be used to facilitate the operations described herein. Computer system 1400 may take various different forms such as, for example, a tablet, a desktop, a distributed system that includes one or more connected computing components/devices that are in communication with computer system 1400, a laptop computer, a mobile phone, a server, a data center, and/or any other computer system.

In its most basic configuration, computer system 1400 includes various different components. For example, FIG. 14 shows that computer system 1400 includes at least one processor 1405 (aka a "hardware processing unit"), I/O 1410, a metric agent(s) 1415 (or metric tracking agent(s)), and storage 1420.

The storage 1420 may include computer-executable instructions in the form of code 1425. Storage 1420 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

As used herein, the term "executable module," "executable component," "engine," "model," or even "component" can refer to software objects, routines, or methods that may be executed on computer system 1400. The different components, models, modules, engines, and services described herein may be implemented as objects or processors that execute on computer system 1400 (e.g., as separate threads). It will be appreciated that engines, modules, models, or components may be a combination of one or more processors and executable instructions that cause the processor(s) to perform specialized functions, such as those described throughout this disclosure and in particular with relation to each individual method act described in FIGS. 11A, 11B, 12, and 13.

In other instances, the components, modules, models, or engines may simply be executable instructions that are executable by any type of processor. In yet other instances, the components, modules, models, or engines, may be in the form of ASICs or even system-on-chip ("SOC") devices specially configured to perform any individual operation (e.g., any one act included in the methods from FIGS. 11A to 13) or to perform multiple operations (e.g., any combination of the method acts from FIGS. 11A to 13). In this regard, a component, module, model, or engine can be thought of as a hardware processing unit, a compilation of executable code, or combinations of the above that enable a computer system to perform specialized operations.

The disclosed embodiments may comprise or utilize a special-purpose or general-purpose computer including computer hardware, such as, for example, one or more processors (such as processor 1405) and system memory (such as storage 1420), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras, accelerometers, gyroscopes, acoustic sensors, magnetometers, data acquisition systems, etc.). Further, computer system 1400 may also be connected through one or more wired or wireless networks 1435 to remote/separate computer systems(s) that are configured to perform any of the processing described with regard to computer system 1400 or that are configured to execute applications and acquire corresponding sets of historic execution state information. Additionally, or alternatively, computer system 1400 is able to acquire information from any number of external applications, either directly or indirectly via the network 1435.

I/O 1410 devices include any type of input/output device such as, but not limited to, displays, keyboards, mice, etc. I/O 1410 also includes any number of visualization engines (e.g., display graphics or a graphics rendering engine) that may be configured, with processor 1405 and/or with one or more GPUs, to render one or more images for a user. The metric agent(s) 1415 can be any type of defined data structure capable of including a defined scope, a log, and in some cases a counter and capable of being transmitted between compute nodes. The counter 1415A can be a specialized processing unit configured to monitor any type of processing performed by a compute node. Additionally, metric counter 1415A (e.g., the metric counter discussed earlier) is used to incrementally calculate how much resources are used by any corresponding compute node.

A "network," like the network 1435 shown in FIG. 14, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1435. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

It will also be appreciated that computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g., cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1405). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for operating in a network that includes one or more upstream components that process data for one or more downstream components of the network, the computing system comprising:
   one or more processors; and
   one or more storage devices having stored computer-executable instructions that are executable by the one or more processors to configure the computing system to implement a method for tracking computational usage comprising one or more metric values associated with processing the data and by at least performing the following:
- at the upstream component receive a data packet to be processed with a particular process for a downstream component;
- at the upstream component, the upstream component receiving different metric tracking agents from different corresponding downstream components, each of the different corresponding metric tracking agents specifying different processing of resources associated with each of the different downstream components to be tracked by the upstream component, the different corresponding metric tracking agents including a metric tracking agent associated with a metric counter configured to calculate a metric value of physical and/or logical processing units associated with performing a particular process, wherein the metric tracking agent also defines a scope of network resources to be tracked when processing the data;
- at the upstream component, apply the particular process to the data packet in accordance with the scope defined by the metric tracking agent to generate a processed data packet;
- at the upstream component, use the metric tracking agent to log the metric value associated with performing the particular process; and
- at the upstream component, provide the metric value to at least one of the downstream component or a metric store.

2. The computing system of claim 1, wherein the computer-executable instructions are further executable by the one or more processors to configure the computing system to:
based at least partially on the metric value, perform one or more optimizations on the network.

3. The computing system of claim 2, wherein the one or more optimizations include moving one or more compute nodes included within the downstream component to the upstream component.

4. The computing system of claim 1, wherein providing the metric value to the at least one of the downstream component or the metric store includes providing the metric value within a wrapper of the processed data packet.

5. The computing system of claim 1, wherein providing the metric value to the at least one of the downstream component or the metric store includes providing the metric value as an appended metric value to one or more other metric values associated with one or more different metric tracking agents that identify one or more other metric values associated with previous processing of the data packet prior to the data packet being received by the upstream component.

6. The computing system of claim 1, wherein the metric value identifies a unit of physical resources consumption.

7. The computing system of claim 1, wherein the metric value identifies a CPU cycle count.

8. The computing system of claim 1, wherein the metric value identifies a logical unit of resource consumption associated with networking, input/output processes, or CPU processing.

9. The computing system of claim 1, wherein the computer-executable instructions are further executable by the one or more processors to configure the computing system to:
cause registering of the metric tracking agent with a subsequent system boundary or with the metric store.

10. The computing system of claim 1, wherein the computer-executable instructions are further executable by the one or more processors to configure the computing system to:
cause the upstream component to request the metric tracking agent from the downstream component.

11. The computing system of claim 1, wherein providing the metric value to the at least one of the downstream component or the metric store includes providing the metric value to the metric store.

12. The computing system of claim 1, wherein providing the metric value to the at least one of the downstream component or the metric store includes providing the metric value to the downstream component.

13. A method for tracking computational usage comprising one or more metric values associated with processing data in a network that includes one or more upstream components that process the data for downstream components, the computational usage comprising one or more metric values associated with processing the data, the method comprising:
- at an upstream component, the upstream component receiving different metric tracking agents from different corresponding downstream components, each of the different corresponding metric tracking agents specifying different processing of resources associated with each of the different downstream components to be tracked by the upstream component, the different corresponding metric tracking agents including a metric tracking agent associated with a metric counter configured to calculate a metric value of physical and/or logical processing units associated with performing a particular process, wherein the metric tracking agent also defines a scope of network resources to be tracked when processing the data:
- at the upstream component, applying the particular process to the data packet in accordance with the scope defined by the metric tracking agent to generate a processed data packet;
- at the upstream component, using the metric tracking agent to log the metric value associated with performing the particular process; and
- at the upstream component, providing the metric value to at least one of the downstream component or a metric store.

14. The method of claim 13, wherein the method further includes:
based at least partially on the metric value, performing one or more optimizations on the network.

15. The method of claim 14, wherein the one or more optimizations include moving one or more compute nodes included within the downstream component to the upstream component.

16. The method of claim 13, wherein the method further includes registering the metric tracking agent with the downstream component or with the metric store by including the metric tracking agent as a wrapper around the processed data packet.

17. The method of claim 13, wherein providing the metric value to the at least one of the downstream component or the metric store includes providing the metric value as an appended metric value to one or more other metric values associated with one or more different metric tracking agents that identify one or more other metric values associated with previous processing of the data packet prior to the data packet being received by the upstream component.

18. A method for tracking computational usage in a network that includes one or more upstream components that process data for one or more downstream components, the method comprising:

at a downstream component that receives one or more processed data packets from an upstream component, receiving a request from the upstream component for a metric tracking agent that is associated with a metric counter configured to calculate a metric value of physical and/or logical processing units associated with performing a particular process on data for generating the one or more processed data packets for the downstream component, wherein the metric tracking agent also defines a scope of network resources that may be used when processing the data;

the downstream component providing the metric tracking agent to the upstream component, wherein metric tracking agent is only one of multiple metric tracking agents provided to the upstream component from a plurality of corresponding downstream components;

at the downstream component, receiving the one or more processed data packets; and at the downstream component, receiving the metric value associated with performing the particular process, the metric value being logged by the metric tracking agent and being received with the one or more processed data packets.

19. The method of claim 18, wherein the method further includes:

based at least partially on the metric value, performing one or more optimizations on the network.

20. The method of claim 19, wherein the one or more optimizations include moving one or more compute nodes included within the upstream component to the downstream component.

21. The computing system of claim 1, wherein the metric tracking agent also defines a scope of network resources that may be used when processing the data.

* * * * *